United States Patent [19]

Di Gianfilippo et al.

[11] Patent Number: 4,470,675
[45] Date of Patent: Sep. 11, 1984

[54] RANDOM ACCESS CONTROL APPARATUS AND METHOD FOR SLIDE PROJECTOR

[75] Inventors: Dominic J. Di Gianfilippo, Mount Prospect; Robert R. Parker, Wheeling, both of Ill.

[73] Assignee: Bell & Howell Company, Chicago, Ill.

[21] Appl. No.: 336,524

[22] Filed: Dec. 31, 1981

[51] Int. Cl.³ .................. G03B 31/00; G03B 23/06; G11B 31/00

[52] U.S. Cl. ........................... 353/15; 340/825.56; 353/25; 353/103; 353/117; 360/80; 434/314; 434/316

[58] Field of Search ............. 353/25, 26 A, 27 A, 353/103, 117, 15; 340/870.29, 825.36, 825.56; 360/80; 434/316, 314

[56] References Cited

U.S. PATENT DOCUMENTS

| | | | |
|---|---|---|---|
| 3,243,780 | 3/1966 | Bendick | 360/80 X |
| 4,041,457 | 8/1977 | Koch | 340/825.56 |
| 4,075,668 | 2/1978 | Keach | 353/15 X |
| 4,080,637 | 3/1978 | Chase et al. | 353/15 X |
| 4,363,055 | 12/1982 | Lee | 353/15 X |

Primary Examiner—Steven L. Stephan
Attorney, Agent, or Firm—James V. Lapacek; Robert J. Schneider; Roger M. Fitz-Gerald

[57] ABSTRACT

Random access slide projector apparatus is provided for the random access presentation of slide programs. The random access apparatus is responsive to an encoded program tape or to input signals from a local or remote keyboard. The encoded program tape includes predetermined slide address signals as burst format signals corresponding to desired slide positions in the slide tray. The random access apparatus decodes the encoded slide address signals and generates appropriate control outputs to move the slide tray to the desired programmed slide position and project the desired slides. The random access apparatus also provides for the recording of slide address signals in accordance with keyboard entries to prepare random access program tapes. The program tape includes one track for the recording of encoded slide address signals and a second synchronized track for narrative program information to accompany the slide program.

18 Claims, 20 Drawing Figures

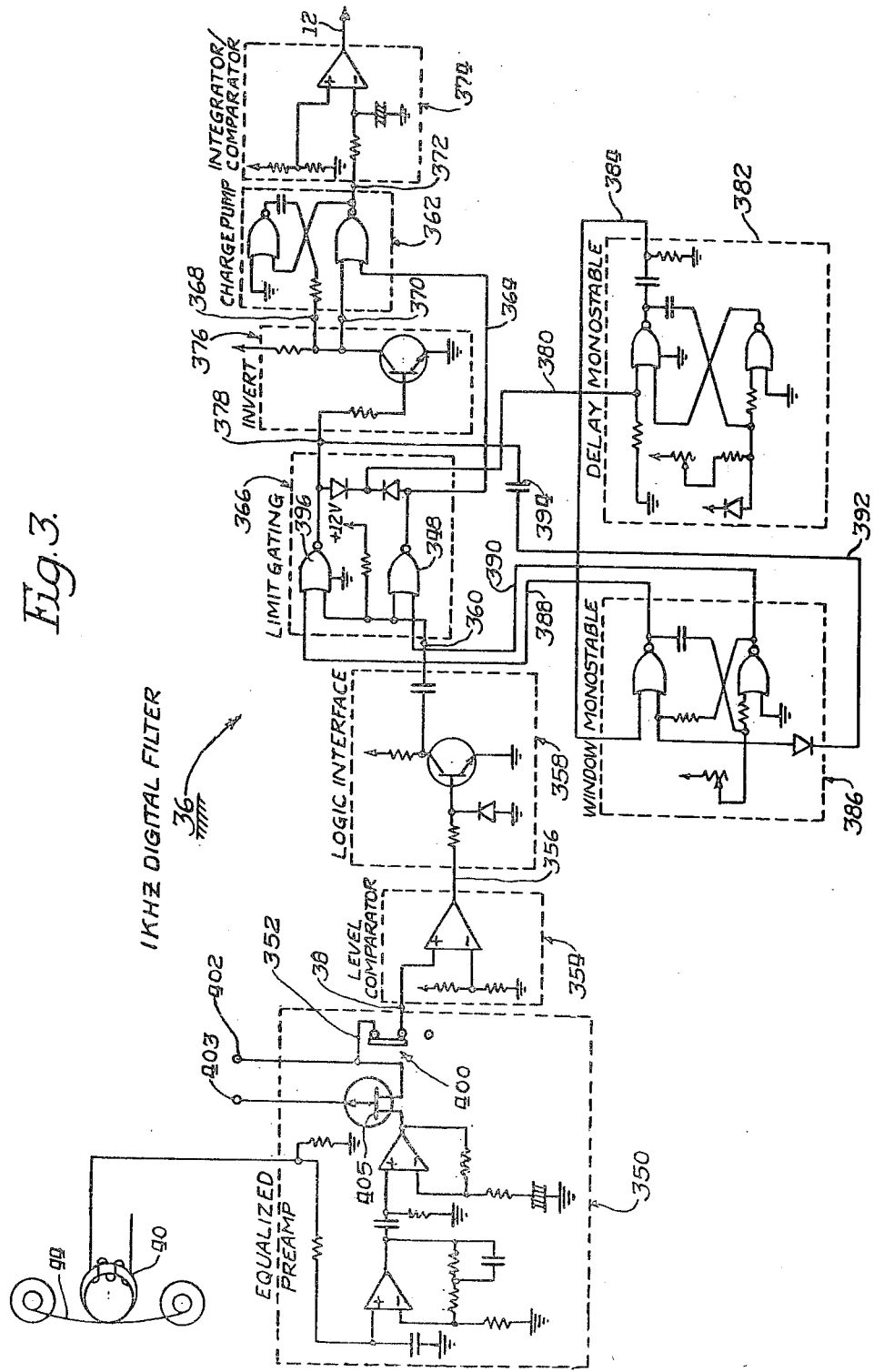

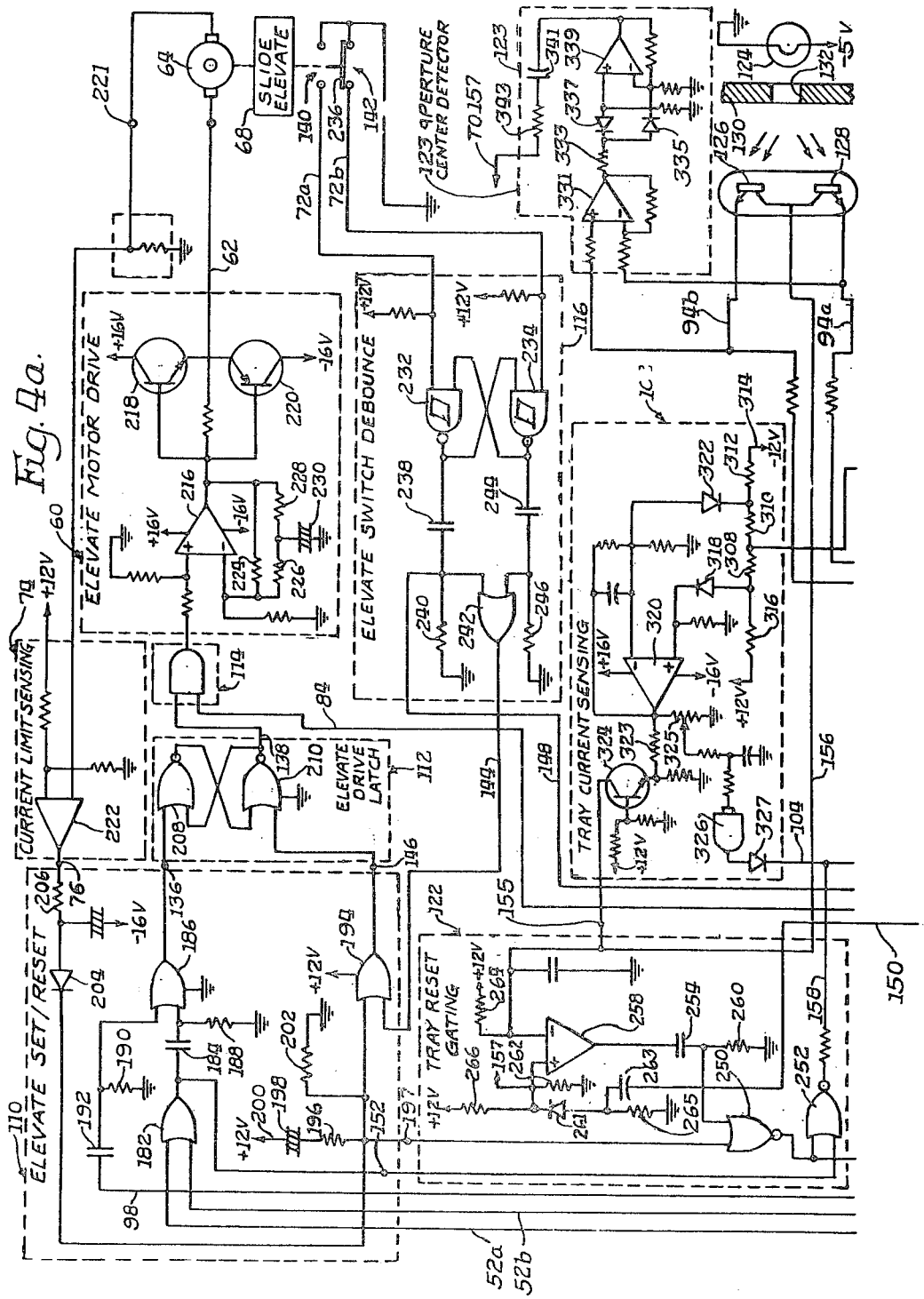

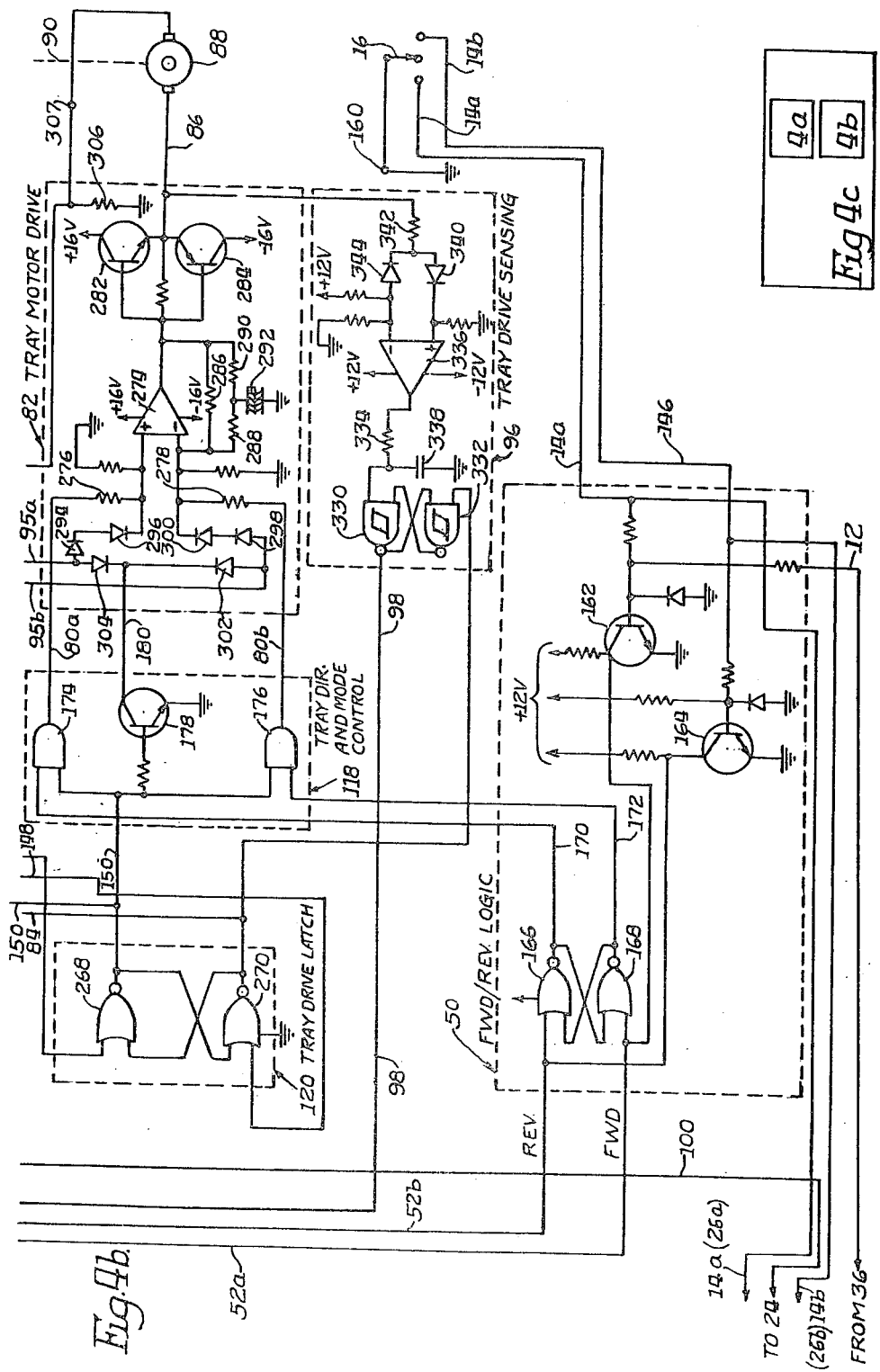

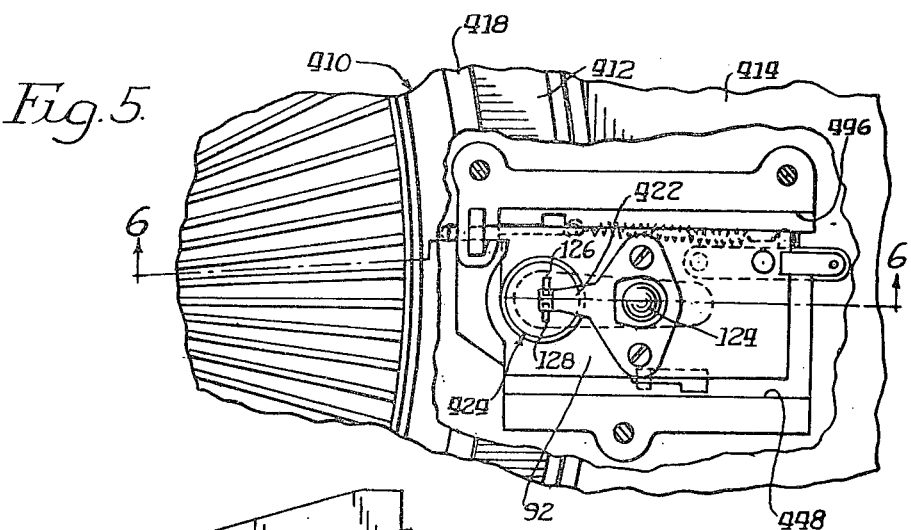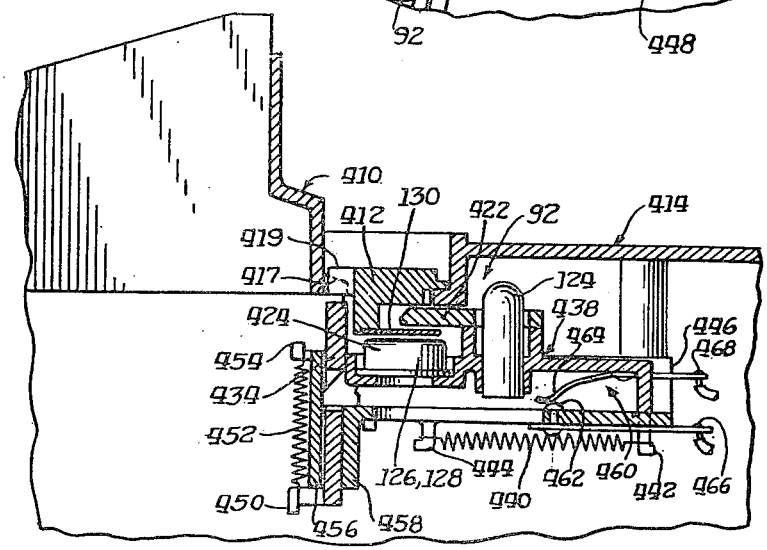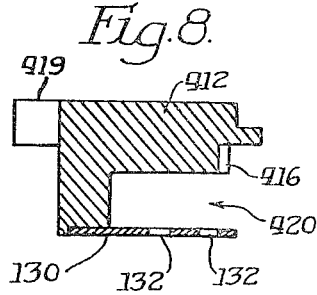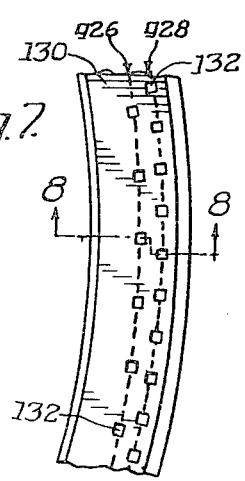

Fig. 10.

| WAVE FORM NO. | FORWARD IN | FORWARD OUT | REVERSE IN | REVERSE OUT | WAVE FORM NO. | FORWARD IN | FORWARD OUT | REVERSE IN | REVERSE OUT |
|---|---|---|---|---|---|---|---|---|---|
| 162 (144, 52a) | +6 0⌐ | +12 ⌐0 | — | — | 334 | ⎍⎍⎍ | | SAME | |
| 164 (14b, 52b) | | | +6 ⌐ | +12 ⌐ | 332 (IN), 330 (OUT) | ⌐ | ⌐ | | |
| 168, 166 | ⌐ | ⌐ | ⌐⌐ | | 192 | ⌐ | ⌐ | | |
| 166, 168 | — | — | ⌐ ⌐ | | 186 | ⌐ | ⌐ | | |
| 182 | ⌐ | ⌐ | | | (136, 138) | ⌐ | ⌐ | | |
| 184 | ⌐ | ⌐ | | | 114 | ⌐ | ⌐ | | |
| 186 | ⌐ | ⌐ | | | 216 (62) | ⌐ | ⌐ | | |
| (136, 138) | ⌐ | ⌐ | | | 234 | ⌐ | ⌐ | | |
| 114 | ⌐ | ⌐ | | | 244 | ⌐ | ⌐ | | |
| 216 (62) | ⌐ | ⌐ | | | 242 | ⌐ | ⌐ | | |
| 232 | ⌐ | ⌐ | | | 194 | ⌐ | ⌐ | | |
| 238 | ⌐ | ⌐ | | | 210 | ⌐ | ⌐ | | |
| 242 | ⌐ | ⌐ | | | | | | | |
| 194 | ⌐ | ⌐ | | | | | | | |
| 210 (146, 138) | ⌐ | ⌐ | | | | | | | |
| (148, 150) | ⌐ | ⌐ | | | | | | | |
| 174 | ⌐ | ⌐ | — | — | | | | | |
| 176 | — | — | ⌐ | ⌐ | | | | | |
| 274 | (AB+) ⌐ | ⌐ | (AB−) ⌐ | ⌐ | | | | | |
| (86) | | | | | | | | | |
| CURRENT TO (126, 128) | LIGHT CURRENT ⌐ | ⌐ | | | | | | | |
| 258 | CURRENT ⌐ | ⌐ | | | | | | | |
| 254 | ⌐⌐ | | | | | | | | |
| 250 | ⌐ T | | | | | | | | |
| 252 | T ⌐ | | | | | | | | |
| 268 | ⌐ ⌐ | | | | | | | | |
| 118 | ⌐ ⌐ | — | — | | | | | | |
| 176 | — | — | ⌐ ⌐ | | | | | | |
| 274, (86) | (AB+) +12 | 0 ⌐ | | | | | | | |
| 178 (152, 180) | +12 0⌐ | ⎍-12 | ⌐ | ⎍⎍ | | | | | |

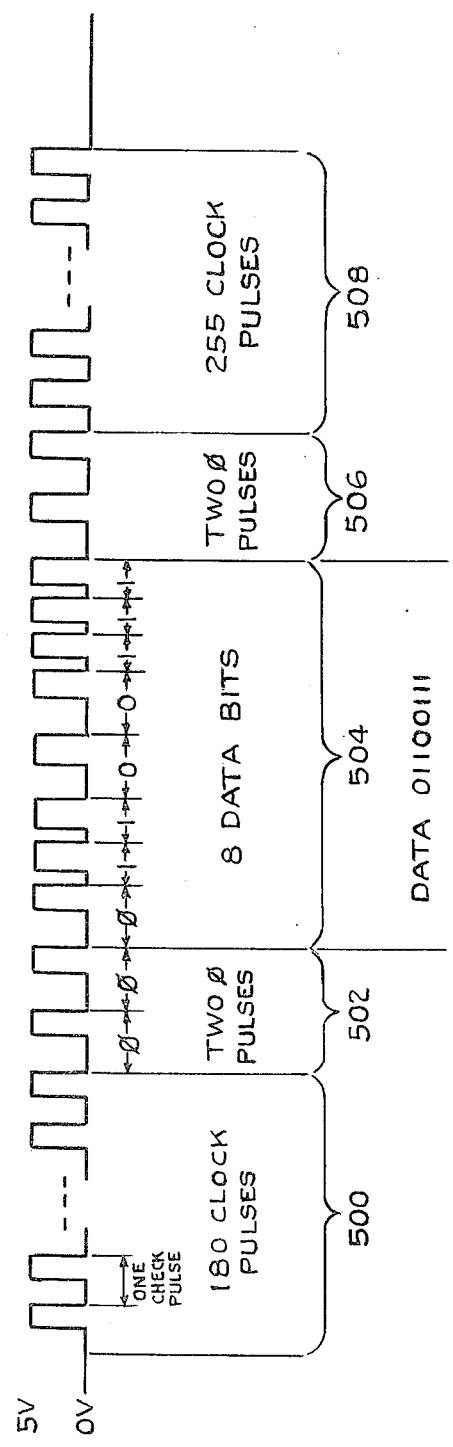

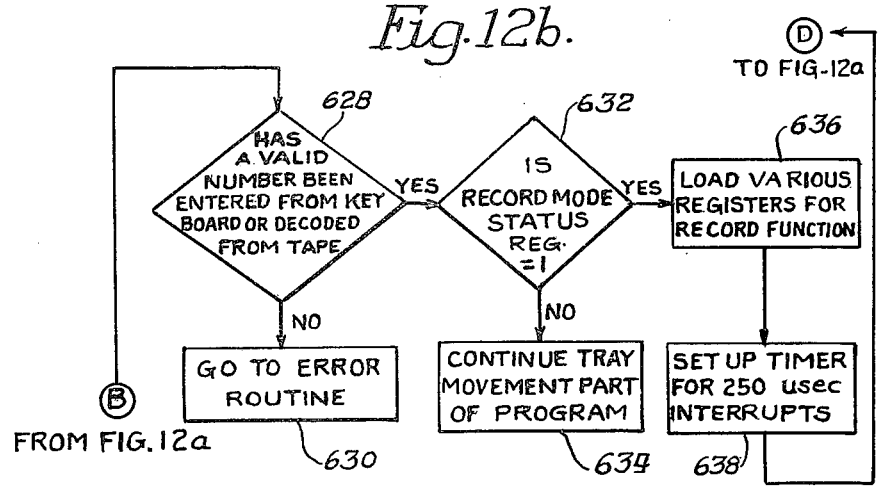
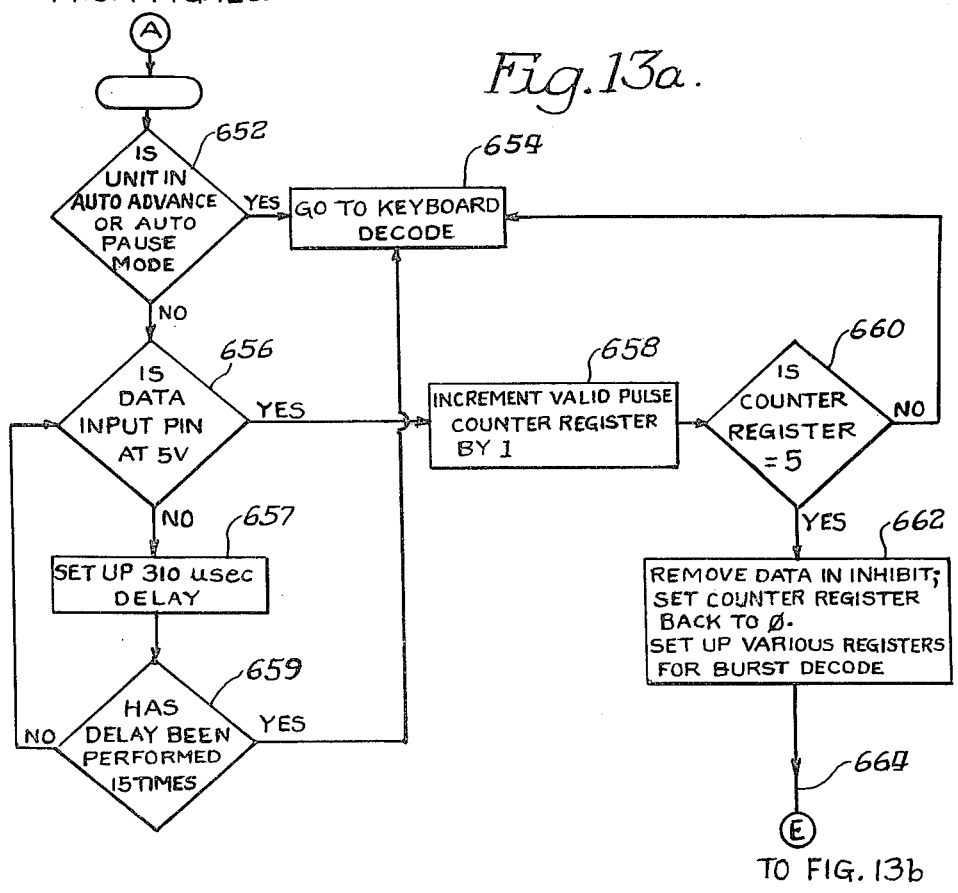

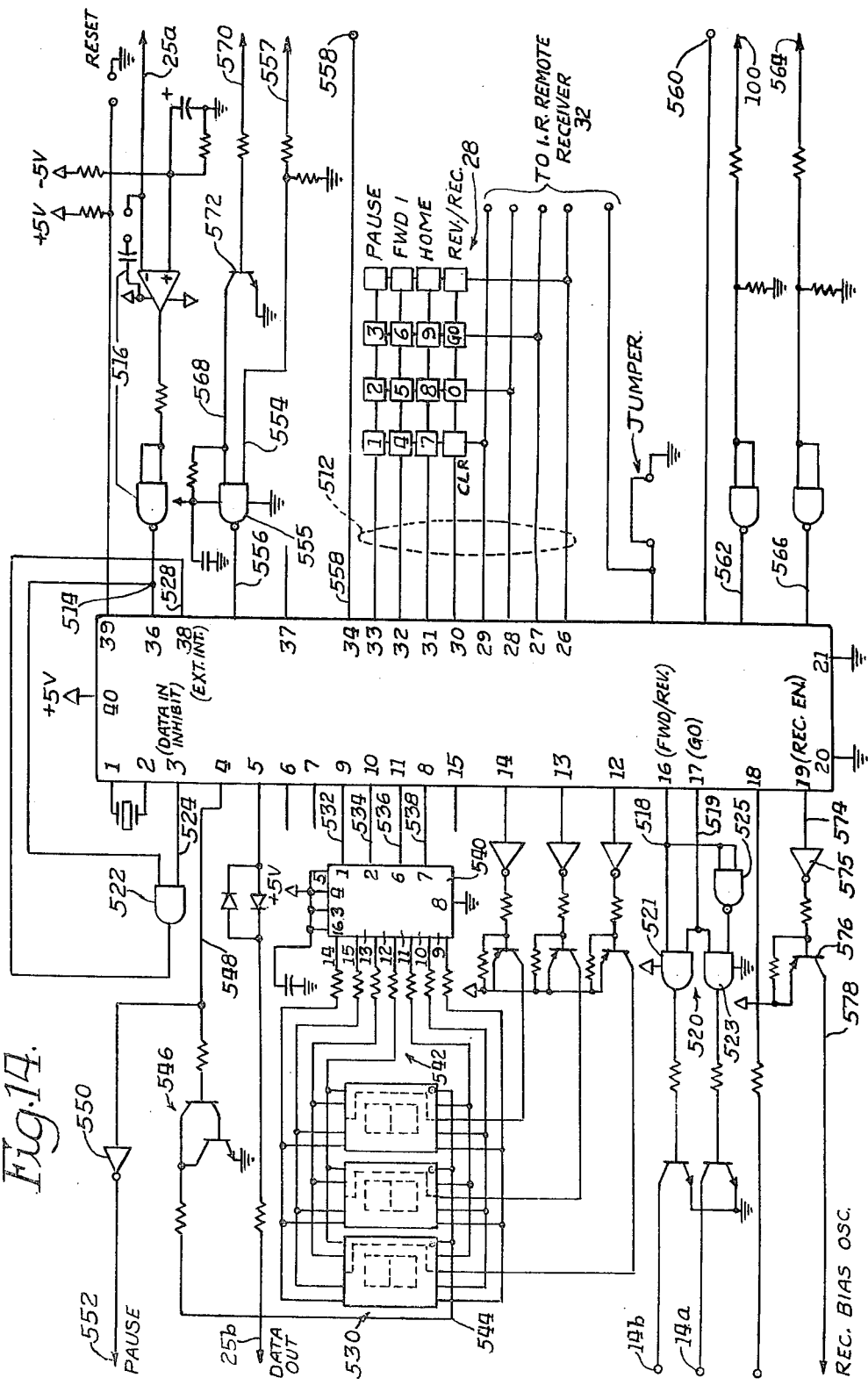

RANDOM ACCESS CONTROL APPARATUS AND METHOD FOR SLIDE PROJECTOR

BACKGROUND OF THE INVENTION

A. Field of the Invention

The present invention relates generally to slide projectors and more particularly to random access apparatus for controlling the projection of slides from a slide tray in accordance with an encoded program tape including slide address signals or in accordance with the entry of slide address signals from a local or remote keyboard.

B. Description of the Prior Art

Various control apparatus are known for slide projectors to control positioning of the slide tray to a slide position and the operation of a slide changer to present the slide to a viewing position. These various control apparatus are controllable in either a manual mode or a random access mode. Arrangements of this type, for example, are disclosed in U.S. Pat. Nos. 3,296,727, 3,225,652, 3,299,554, 3,895,864, 3,907,414, 3,924,942, 3,566,370, 4,041,457, 3,510,215, 3,644,027, 3,733,122, 3,652,155, 3,623,803, 3,700,320 and 3,732,546.

While the above described control apparatus of the prior art are generally suitable for their intended use, it would be desirable to provide improved automatic random access operation of a slide projector by control apparatus in response to encoded prerecorded program tapes including slide address signals.

SUMMARY OF THE INVENTION

Accordingly, it is a principal object of the present invention to provide random access control apparatus for controlling the projection of slides from a slide tray in accordance with an encoded program tape including slide address signals, the control apparatus also being capable of generating said encoded program tape by the recording of slide address signals in response to the inputs from a keyboard.

It is another object of the present invention to provide random access operation of a slide projector in response to an encoded program tape including slide address signals digitally encoded as tone bursts wherein random access control apparatus is provided to decode the address signals.

It is a further object of the present invention to provide random access slide projector apparatus that operates in response to either prerecorded encoded program tapes including slide address signals or by slide address signals inputted on a local or remote keyboard.

It is yet another object of the present invention to provide random access operation of a slide projector from a prerecorded program tape including slide address signals on one track and synchronized program information on another track.

Briefly, these and other objects of the present invention are achieved by providing random access slide projector apparatus for the random access presentation of slide programs. The random access apparatus is responsive to an encoded program tape or to input signals from a local or remote keyboard. The encoded program tape includes predetermined slide address signals as burst format signals corresponding to desired slide positions in the slide tray. The random access apparatus decodes the encoded slide address signals and generates appropriate control outputs to move the slide tray to the desired programmed slide position and project the desired slides. The random access apparatus also provides for the recording of slide address signals in accordance with keyboard entries to prepare random access program tapes. The program tape includes one track for the recording of encoded slide address signals and a second synchronized track for narrative program information to accompany the slide program.

The invention both as to its organization and method of operation together with further objects and advantages thereof will best be understood by reference to the following specification taken in conjunction with the accompanying drawings.

BRIEF DESCRIPTION OF THE DRAWINGS

FIG. 3 is a logic and schematic diagram of a tray advance detection circuit of the control apparatus of FIGS. 1 and 2;

FIGS. 4a and 4b when combined as shown in FIG. 4c form a logic and schematic diagram of the control apparatus of FIG. 2;

FIG. 5 is a plan view of portions of the control apparatus of FIGS. 1, 2 and 4 with portions cut away for clarity, illustrating the turntable carrying the slide tray, the coded aperture slide position ring and the feedback sensing arrangement of the control apparatus;

FIG. 6 is a sectional view of the apparatus taken along the line 6—6 of FIG. 5;

FIG. 7 is a fragmentary view illustrating the coded aperture ring and turntable of the control apparatus of FIGS. 1 through 4;

FIG. 8 is a sectional view of the apparatus taken along the line 8—8 of FIG. 7.

FIG. 10 is a graphical representation illustrating signal waveforms at various locations in the control apparatus of FIGS. 1 through 4;

FIG. 11 is a graphical representation of a typical slide address burst format waveform that is encoded by the control apparatus of FIGS. 1 through 4 for random access operation;

FIGS. 12a and 12b when assembled as denoted represent a logical flow diagram illustrating the general flow of program steps performed by the control apparatus of the present invention for encoding slide address signals for a program tape;

FIGS. 13a and 13b when assembled as denoted represent a logical flow diagram illustrating the general flow of program steps performed by the control apparatus of the present invention for decoding slide address signals from a program tape FIG. 14 is a schematic, logic and block diagram representation of the CPU controller and of other portions of the control apparatus of FIGS. 1 and 2.

DETAILED DESCRIPTION OF THE PREFERRED EMBODIMENT

Figure 1:
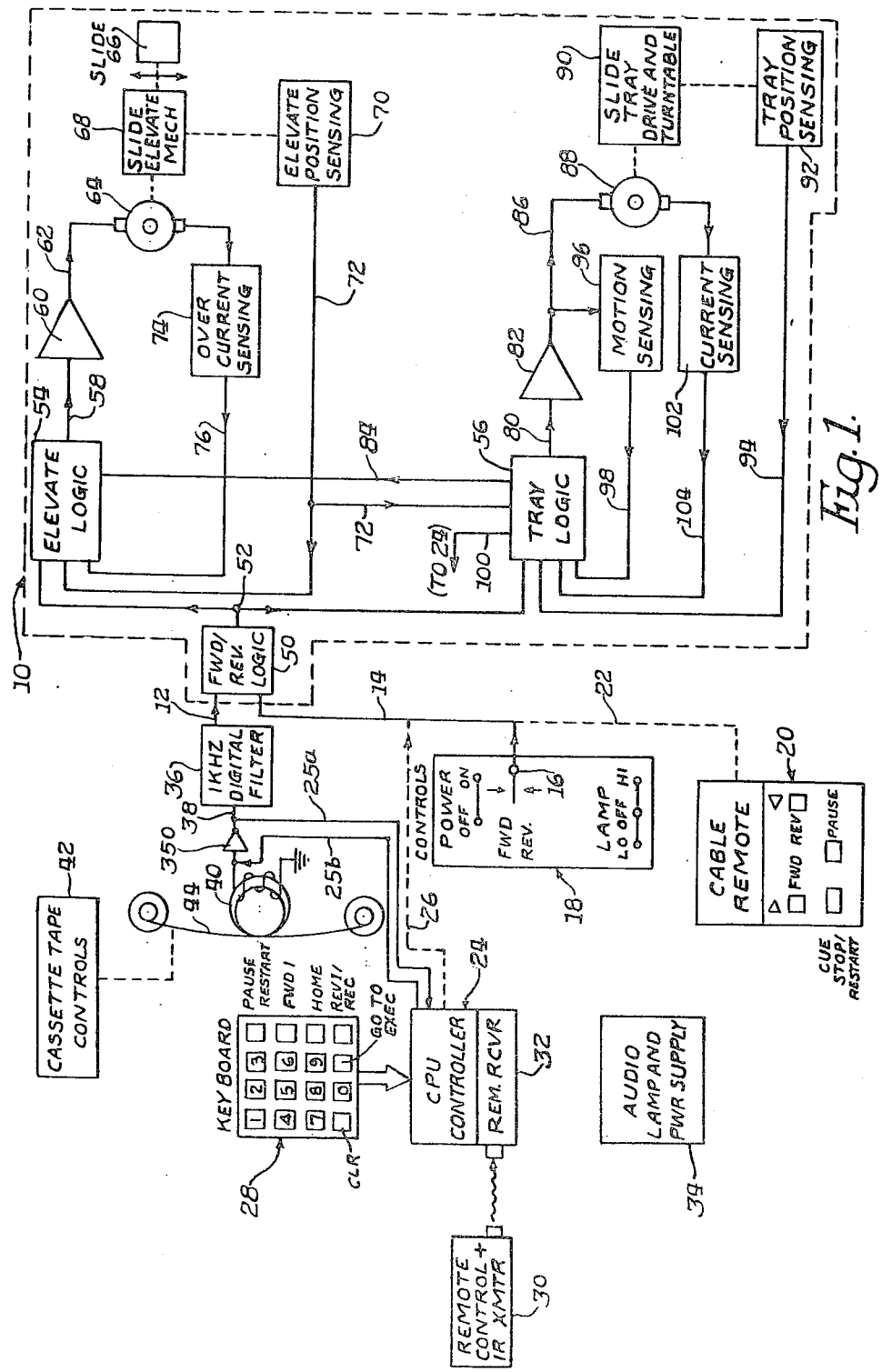
FIG. 1 is a block diagram representation of the control apparatus of the present invention for random access operation of a slide projector.

Referring now to FIG. 1, the control apparatus 10 and CPU random access controller 24 of the present invention provide random access operation of projection apparatus. The control apparatus 10 in response to control signals at 14 controls rotation of a slide tray and operation of a slide change mechanism to control movement of a slide adjacent the slide projection station between a viewing position and a slide tray position.

The control signals at 14 provide digital signals on one or more lines representing a forward or reverse mode of slide tray movement to which the control apparatus 10 is responsive to appropriately move the slide tray to a desired position.

The projection apparatus of FIG. 1 includes a cassette tape arrangement including appropriate controls referred to generally at 42 for controlling the transport of a cassette tape referred to at 44. A tape transducing head 40 provides an audio output to a preamplifier stage 350. The preamplifier stage 350 provides an audio output 38. The cassette tape includes encoded slide address signals on one track and recorded narrative information on a separate track. The narrative track information is transduced and provided by the audio circuitry in an audio, lamp, and power supply circuitry stage referred to generally at 34. Thus, a synchronized narrative program and slide selection is provided in timed relationship.

In a manual random access arrangement of the projection apparatus of FIG. 1, the CPU controller 24 provides the control signals at 14 over an interconnecting signal path 26. The CPU controller 24 is responsive to the inputs from a keyboard 28 to provide random access operation of the control apparatus 10. A desired slide number is inputted on the keyboard 28 and the CPU controller 24 determines the appropriate rotation of the slide tray via the control apparatus 10 that is required to bring the desired slide to the slide changer viewing position as will be explained in more detail hereinafter.

The CPU controller 24 in an automatic random access mode is also responsive to encoded burst signals on the cassette tape 44 defining specific slide address positions in the slide tray. The CPU controller 24 decodes the encoded slide address burst signals on a data line 25a connected at the output of the preamplifier stage 350 and provides the control signals at 14 via the interconnecting signal path 26 for random access operation in accordance with the recorded program cassette tape.

The CPU controller 24 also provides for the recording of program cassette tapes over a data line 25b in response to inputs from the keyboard 28 in a program record mode by recording the corresponding encoded slide address signals in a burst signal format on the program tape 44. Further, mode and function controls are also encoded and decoded by the CPU controller 24.

In an alternate embodiment of the projection apparatus of FIG. 1 where a CPU controller 24 is not utilized, the control signals at 14 are provided from a forward-/reverse tray advance control switch 16 of the local control panel 18. The local control panel 18 also includes an on/off power switch and a lamp mode control switch. The control signals at 14 are also capable of being provided from a remote control unit 20 over a remote cable interconnection 22. The remote control unit 20 includes forward and reverse slide advance controls.

In this alternate embodiment, an advance control signal 12 is provided by a digital filter stage 36. The control signal 12 similarly to the control signal 14 is utilized by the control apparatus 10 to control rotation of a slide tray and operation of a slide change mechanism. The control signal 12 represents a slide advance signal derived from the program tape 44 to which the control apparatus 10 is responsive to advance the slide tray by one slide position in response to each occurrence of the signal 12. The digital filter stage 36 is connected to the audio output 38 from the preamplifier stage 350. The cassette tape 44 includes 1 KHz sinewave or encoded advance bursts that are decoded by the digital filter stage 36 to provide desired advance control signals at 12 in accordance with the desired program recorded on the cassette tape 44.

In the preferred embodiment of the projector apparatus utilizing a CPU controller 24, the forward/reverse control 16 of local control 18 is deleted since forward and reverse keys are provided on the keyboard 28. The remote control unit 20 is also not utilized. Further, the digital filter stage 36 is not utilized and the output 12 is not functional; the CPU controller 24 performing all the required decoding of the encoded slide address signals on the program cassette tape 44.

The projection apparatus with the CPU controller 24 is also operable to provide the control signal 14 over the interconnection 26 by means of a wireless remote control transmitter unit 30 and a receiver 32. The remote control transmitter 30 and receiver 32 operate, for example, on the basis of infrared energy transmission. The receiver 32 responds to the transmitted signals from the transmitter 30 and provides desired slide information as data signals to the CPU controller 24. In a specific arrangement, the remote control and transmitter unit 30 is provided with a keyboard such as the keyboard 28 such that complete functioning and control of the controller apparatus 10 is provided by the remote control transmitter unit 30.

The control apparatus 10 includes a forward/reverse logic stage 50 that is responsive to the mode advance control signals 12, 14. The forward/reverse logic stage 50 generates forward and reverse mode signals 52 to a slide elevate logic stage 54 and a slide tray logic stage 56 in accordance with the state of the input signals 12, 14. In response to a forward or reverse mode signal from the output 52, the elevate logic stage 54 is set to slide elevate mode and provides an output at 58 to a slide elevate motor drive amplifier 60. The motor drive amplifier 60 at output 62 drives the slide elevate motor 64 to elevate a slide 66 in the projection position to an upward slide tray position through operation of a slide elevate mechanism 68. The slide elevate mechanism 68 (not shown in detail) receives a unidirectional input from the slide elevate motor 64 to drive a reversible feed screw or endless worm arrangement similar in general respects to the drive arrangement of U.S. Pat. No. 3,353,443 and described in detail in U.S. application Ser. No. 336,470 filed by N. Mischenko on Dec. 31, 1981, now U.S. Pat. No. 4,429,963.

During normal steady state operation of the projector apparatus including initial power-up of the system and between slide changes, the elevate logic 54 is conditioned with the slide elevate mechanism 68 in the downward slide projection position with a slide 66 in the projection position. Thus, for selection of a new slide for projection in the single slide advance mode, random access slide programming mode, or rapid search mode between various slide tray positions, the basic operational cycle begins with elevation of the particular slide presently in the projection position back into the upward tray position, and proceeds with the controlled rotation of the slide tray by one or more slide positions and finishes with the lowering of the desired slide for presentation into the projection position by operation of the slide elevate motor 64.

An elevate position sensing arrangement 70 is appropriately positioned proximate the slide elevate mechanism 68 and includes up and down limit sensing switches to detect predetermined movement of the slide elevate mechanism 68 between a predetermined tray position and a predetermined projection position at the slide elevation station. The elevate position sensing arrangement 70 provides outputs at 72 to the elevate logic stage 54 to terminate operation of the elevate signal 58 and thus appropriately drive the slide elevating mechanism 68 between the predetermined up and down positions. A current sensing stage 74 monitors current through the slide elevate motor 64 and provides at output 76 a disable control signal to the elevate logic stage 54 in the event of sensed current of an excessive value. The elevate logic stage 54 responds to an excessive current condition at 76 to terminate the drive signal to the slide elevate motor 64.

After the slide presently in the projection position has been elevated to the slide tray position, the control apparatus 10 proceeds to the slide tray movement mode wherein the slide tray is moved by one or more positions in an appropriate forward or reverse direction in response to the forward/reverse logic stage 50.

Specifically, the signal 72 from the elevate position sensing arrangment 70 is connected as an input to the slide tray logic stage 56. The slide tray logic stage 56 in response to the signal at 72 is conditioned to the tray drive mode. In response to the status of the forward or reverse mode signal 52 as an input to the slide tray logic stage 56, the slide tray logic stage 56 outputs at 80 an appropriate forward or reverse tray drive signal to a tray motor drive amplifier 82. The slide tray logic stage 56 also includes a mode select latch operable in either a forced mode or a servo mode. Additionally, the slide tray logic stage 56 provides a mode control output 84 to disable the elevate logic stage 54 to insure disabling of the elevate function when the slide tray logic 56 is conditioned to the forced mode.

In response to the tray drive signal 80, the slide tray motor drive amplifier 82 at output 86 provides a drive signal of appropriate polarity to operate a slide tray motor 88 in either the forward or reverse direction. The slide tray motor 88 is operatively coupled to appropriately drive a slide tray drive and turntable arrangement 90 in the corresponding forward or reverse direction.

The slide tray drive and turntable arrangement 90 includes a circumferential apertured ring with one aperture corresponding to each respective slide tray position as illustrated in FIGS. 7 and 8 and described in more detail hereinafter. A slide tray position sensing arrangement 92 is disposed in the path of travel of the circumferential coded aperture ring of arrangement 90.

The slide tray position sensing arrangement 92 includes a light source and two photodetectors all as shown in more detail in FIGS. 2, 4, 5 and 6. The two photodetectors are arranged in predetermined spaced relationship along the circumferential path of travel of the aperture configuration so as to provide differential output sensing of each of the apertures as each respective aperture is moved within the operating range of the dual photodetectors. Dependent upon the direction of slide tray rotation, as the aperture approaches the dual photodetector station, one of the photodetectors will receive illumination of a higher magnitude than the other photodetector. Further, when the aperture is arranged directly over the midpoint between the two photodetectors, the photodetectors receive equal illumination through the aperture. The outputs at 94 from the differential photodetectors of the sensing arrangement 92 are connected to the slide tray logic stage 56 to provide appropriate servo loop feedback control signals to accurately position the slide tray in a desired position.

In accordance with important aspects of the present invention, the control apparatus 10 by means of the slide tray logic stage 56 is operable in a first forced mode of operation in the tray drive mode during which the slide tray logic stage 56 by means of output signal 80 drives the slide tray motor 88 between one or more slide positions as dependent upon the input signal 52.

If the input signal 52 remains in either a high forward or reverse signal state, the slide tray logic 56 is maintained in a forced mode for rapid search or random access with movement of the slide tray and turntable between the present slide position and a desired slide position. When the control signal 52 is generated for a single slide advance in the forward or reverse direction, the forced mode of operation by means of the slide tray logic stage 56 and signal 80 provides for forced mode control movement of the slide tray between the present slide position and the next successive slide position.

The forced mode of operation is terminated for a single advance slide situation when the slide tray position sensing arrangement 92 by means of output signals 94 senses the next slide position. In response to the sensed condition at signal 94, the slide tray logic stage 56 terminates forced mode operation and is then operable in the servo mode of operation under the control of the outputs at 94 from the dual photodetector devices to accurately position the slide tray and turntable 90 at the next slide position. The forced mode of operation is similarly terminated and the servo mode of operation initiated during random access or rapid search situations after the control signal 52 is terminated and upon the next occurrence of the signal 94 from the slide tray position sensing arrangement 92.

The control apparatus 10 also includes a motion sensing stage 96 that is responsive to the slide tray motor control voltage 86 and that provides an output at 98 to the slide tray logic stage 56. The output at 98 indicates that the slide tray has moved, stopped and locked on to the appropriate slide tray position in the servo mode. The slide tray logic 56 responds to the input signal 98 and generates an output at 84 to the elevate logic 54 to set the elevate logic 54 to the enable mode to allow downward positioning of the slide by the elevate mechanism 68 to lower the slide at the elevate station into projection position after tray movement has terminated. Further, the slide tray logic stage 56 upon entering the servo mode has been disabled or reset from the tray drive mode.

The slide tray logic stage 56 outputs at 100 a slide count signal for use by projection apparatus including the CPU controller 24 to provide incremental slide position movement information to the controller 24. The incremental position signal 100 is provided to the CPU controller 24 since no absolute position information is available in the preferred embodiment of the tray position sensing arrangement of the control apparatus 10. Thus, in response to a known start position and the incremental position signals at 100, the CPU controller 24 stores the present position of the slide tray.

The control apparatus 10 also includes a tray drive motor current sensing stage 102 that monitors current through the slide tray motor 88 and provides an excessive current signal 104 to the slide tray logic stage 56. The slide tray logic stage 56 in response to the excessive current signal 104 terminates tray drive movement by terminating the tray movement signal 80.

Figure 2:
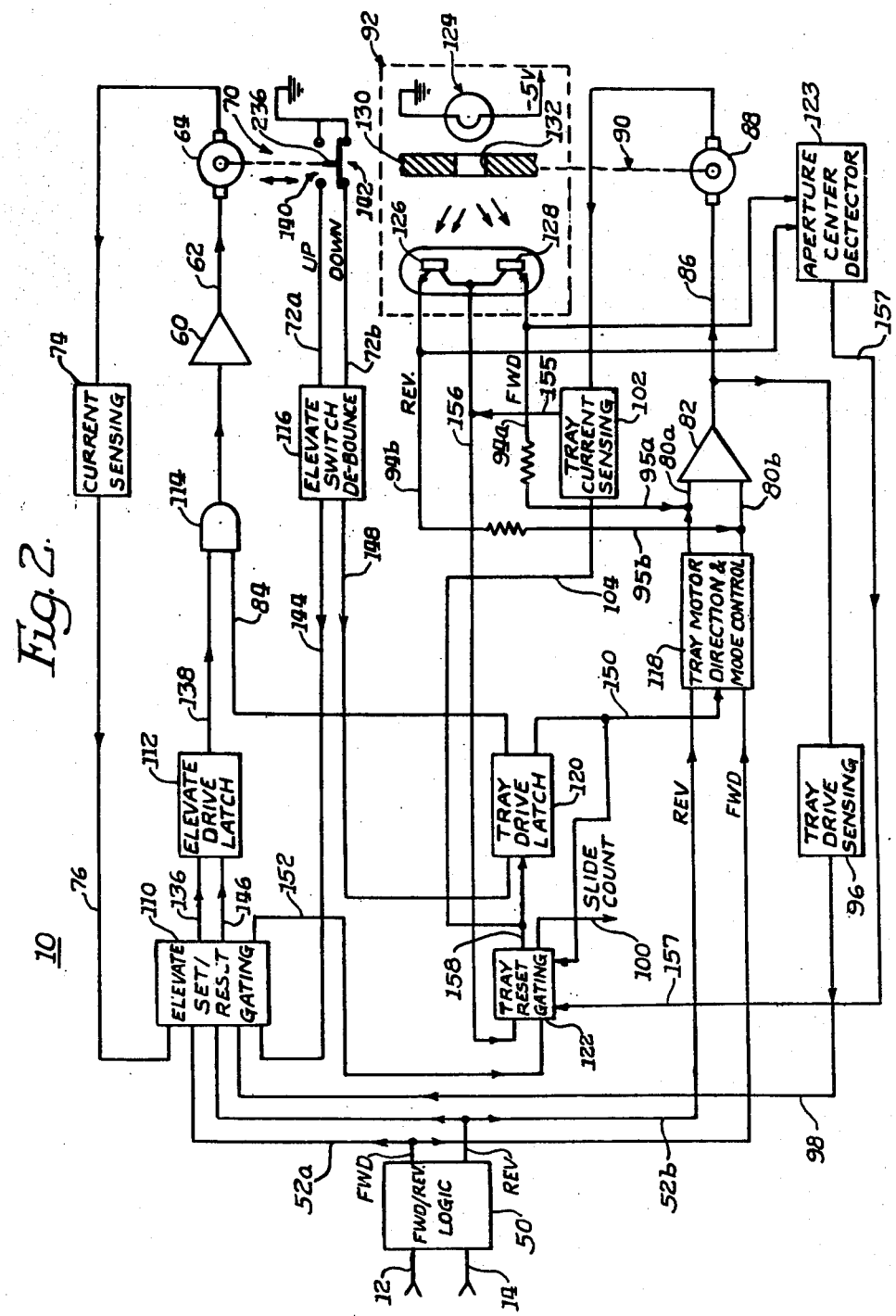
FIG. 2 is a more detailed block diagram representation of the control apparatus of the present invention of FIG. 1.

Referring now to FIG. 2 and considering the detailed structure and operation of the control apparatus 10 of the present invention, the forward/reverse logic stage 50 in response to the input signals 12, 14 provides a forward mode signal 52a and a reverse mode signal 52b with either the forward or reverse signal being active as dependent upon the state of the input signals 12, 14. As discussed hereinbefore, for the preferred embodiment utilizing a CPU controller 24, the signal 12 is not utilized and is non-functional. As illustrated in FIG. 2, the elevate logic stage 54 includes an elevate/reset gating stage 110, an elevate drive latch stage 112 and an elevate/tray interlock stage 114. Similarly, the slide tray logic 56 of FIG. 1 as illustrated in FIG. 2 includes a tray direction and mode control stage 118, a tray drive mode select latch 120, a tray reset gating stage 122, and an aperture center detector stage 123. Additionally, like elements in FIGS. 1 and 2 are designated by like reference numerals.

The slide tray position sensing arrangement 92 of FIG. 2 depicts the light source 124, in appropriate positional relationship with the dual photodetectors 126, 128. A partial edge view of the coded aperture ring of the turntable arrangement 90 is illustrated in operative position with the light source 124 and the two photodetectors 126, 128. An aperture 132 of the coded ring 130 is also shown in the aligned position midway between the photodetectors 126, 128 and aligned with the light source 124 corresponding to the at-rest, servo mode position wherein equal illumination is received by both photodetectors 126 and 128. The output 94a of the photodetector 128 is connected through a series resistor to provide the output signal 95a for connection with the forward drive signal 80a to the tray motor drive amplifier stage 82. The output 94a is also directly connected to the aperture center detector stage 123. Similarly, the output 94b of the photodetector 126 is connected through a series resistor to provide the output signal 95b for connection with the reverse drive signal 80b. The output 94b is also directly connected to the aperture center detector stage 123.

The elevate/reset gating stage 110 in response to an active signal on either the forward mode line 52a or the reverse mode line 52b sets the elevate drive latch 112 over line 136 to the elevate enable mode. With the elevate drive latch 112 in the elevate enable mode, an elevate drive signal output 138 of the latch 112 is coupled through an elevate/tray interlock gate 114 to activate the elevate motor drive 60 and thus provide movement of the elevate motor 64 to elevate a slide from the projection position to the slide tray position. The elevate/tray interlock stage 114 is implemented in a specific embodiment by an AND gate with the signal 138 as one input to the AND gate 114. The second input to the AND gate 114 is connected to the elevate mode enable signal 84 outputted from the tray drive mode select latch 120 of the slide tray logic 56.

Upon movement of the elevate motor 64 to move the slide up into the slide tray position, an up limit switch 140 of the elevate position sensing arrangement 70 is closed to provide a signal at 72a to the elevate switch debounce stage 116. The elevate position sensing arrangement 70 also includes a down limit sensing switch 142 which is closed when the elevate motor 64 moves the slide elevate mechanism 68 to the downward projection position with a corresponding down limit signal transition 72b being supplied to the elevate switch debounce stage 116.

The elevate switch debounce stage 116 in response to a closure of either switch 140 or 142 indicated by the respective input 72a, 72b provides a switch transition output signal 144 to the elevate/reset gating stage 110. The elevate/reset gating stage 110 in response to the switch transition signal at 144 provides an output signal at 146 to reset the elevate drive latch 112 to disable the elevate drive signal 138 thus terminating the upward slide elevate mode. The elevate switch debounce stage 116 in response to closure of the up limit switch 140 at input 72a also provides a switch transition signal at output 148 to set the tray drive mode select latch 120 to the tray drive mode.

The tray drive mode select latch 120 in response to the signal at 148 provides the disabling control signal 84 and further provides a tray drive enable signal 150 to the tray direction and mode control stage 118. When enabled by the tray drive signal 150, the tray direction and mode control stage 118 in accordance with either the forward mode signal 52a or the reverse mode signal 52b being active provides the appropriate corresponding forward drive signal 80a or reverse drive signal 80b to the tray motor drive amplifier 82 to actuate the tray motor 88 to move the slide tray. The tray drive enable signal 150 from the latch 120 also disables servo mode operation of the tray direction and mode control stage 118.

The elevate/reset gating stage 110 provides a forced mode sustaining signal 152 to the tray reset gating stage 122 in response to the active state of either the forward or reverse mode signals 52a or 52b respectively. It will be remembered that in a random access or rapid search mode, one of the corresponding mode signals 52a or 52b will remain active. On the other hand, in a single slide advance condition, the mode signals 52a or 52b will remain active for only a relatively short time duration and will be inactive during the remaining time in which the tray drive latch 120 is in the tray drive enable mode. Thus, if the forced mode sustaining signal 152 is active, the tray direction mode control stage 118 continues to provide either the forward drive signal 80a or the reverse drive signal 80b to the tray motor drive amplifier stage 82.

Thus, if the tray direction and mode control stage 118 is controlled in a rapid search or random access mode, one of the appropriate drive signals 80a or 80b is active to control operation of the slide tray motor 88 to move the slide tray drive and turntable 90 through the appropriate number of slide positions.

When the desired slide position is reached for either a single slide position advance or in the rapid search or random access mode, the drive signal 80a or 80b that is active is disabled by means of the termination of the drive signal 150. The drive signal 150 is terminated when the photodetectors 126, 128 become active corresponding to the positioning of the aperture 132 in the vicinity of the sensing arrangement 92 corresponding to the desired slide position such that light from the source 124 impinges upon the photodetectors 126, 128. Current to the photodetectors 126, 128 is sourced by means of a common supply line 156 from the tray reset gating stage 122.

The tray drive motor current sensing stage 102 provides a control output at 155. The control output at 155 is connected to the supply line 156 to adjust the voltage level at 156 in accordance with the frictional loading on the tray motor 88 as will be explained in more detail hereinafter in connection with FIG. 4. The control output 155 provides appropriate delay of the transition from the forced mode to the servo mode under varying load conditions.

When the photodetectors 126, 128 begin to conduct in response to light impinging thereon from the source 124 through the aperture 132, the tray reset gating stage 122 in response to the signal level at 156 provides a tray drive reset signal at 158 to reset the tray drive mode select latch 120 and terminate the signal 150. Further, if the elevate/reset gating stage 110 detects a continued force drive mode signal on either of the lines 52a or 52b corresponding to rapid search or random access mode, the signal 152 is active to prevent the tray reset gating stage 122 from generating the reset signal 158.

Thus, in the single advance slide situation or in the random access or rapid search mode after the desired position has been reached and the signals 52a, 52b are inactive, the forced mode signal of 80a or 80b is inactive and the servo mode signals 94a, 94b are active to accurately position and stop the slide tray in the desired aligned slide tray position with the slide in the corresponding slide tray position aligned with the slide elevate mechanism 68.

In the case of a single slide advance, the drive signal 150 is utilized by the tray reset gating stage 122 as a temporary servo mode inhibit signal. In this way, the servo mode is temporarily inhibited for a predetermined time interval after the occurrence of the drive signal 150 as will be explained in more detail hereinafter in connection with FIG. 4.

When the tray drive motion sensing stage 96 detects the appropriate sequence of control voltage changes at output 86 to the tray motor 88, the signal 98 is generated to the elevate/reset gating stage 110. In response to the signal 98, the elevate/reset gating stage 110 provides the latch enabling signal 136 to set the elevate drive latch 112 to the elevate mode.

Thus, the elevate drive latch 112 when set to the elevate mode provides the elevate enable signal 138 through the elevate tray interlock gate 114 to provide operation of the elevate motor 64 with the slide elevate mechanism in the up position to lower the slide to the down or projection position.

When the down limit switch 142 is actuated by the slide elevate mechanism 68 with the slide in the down projection position, the elevate switch debounce stage 116 in response to the switch transition at 72b provides the switch transition signal 144 to the elevate/reset gating stage 110 which in turn by means of output 146 resets the elevate drive latch 112 to terminate elevate operation. At this point the stable, steady state operating condition of the control apparatus 10 has been reached with the desired slide in the projection position. The control apparatus 10 now remains in this state until another slide advance control is received by the forward/reverse logic stage 50.

The tray reset gating stage 122 provides the slide count pulse signal at 100 for the CPU controller 24 (where utilized) at the time when the current through line 156 is detected which indicates the approach of an aperture.

The aperture center detector stage 123 in response to the photodetector output signals 94a, 94b provides at output 157 a pulse control signal to the tray reset gating stage 122. The pulse control signal at 157 is utilized by the tray reset gating stage 122 under high frictional loading conditions of the tray drive motor 88 to ensure initiation of the servo mode and termination of the forced mode as will be explained in more detail hereinafter in connection with FIG. 4.

Referring now to FIG. 4 and considering now the details of a specific embodiment of the control apparatus 10 of FIGS. 1 and 2, for projection apparatus of the preferred embodiment utilizing the CPU controller 24, the signal path 26 includes a forward control signal 26a and a reverse control signal 26b. For the alternate embodiment of projection apparatus not including a CPU controller 24, the control signals at 14 include a forward advance control signal 14a and a reverse advance control signal 14b provided by respective contacts of the control switch 16 for projection apparatus provided with the manual advance mode control. A common connection of the switch 16 is connected to ground potential at 160.

The forward control signal 14a or 26a is connected to the forward/reverse logic stage 50 through an input resistor to the base of an NPN transistor 162. The collector of the transistor 162 provides the forward control output signal 52a. The reverse control signal 14b or 26b is connected through an input resistor to an NPN transistor 164. The collector of the transistor 164 is connected to provide the reverse control output signal 52b.

In the alternate embodiment without a CPU controller 24, the automatic advance signal 12 from the digital filter 36 corresponding to program cassette tape advance is connected to the base of the transistor 162.

The forward/reverse logic stage 50 includes a direction control latch formed by two, two-input NOR gates 166 and 168. The forward control signal 52a is connected to one input of the gate 168 and the reverse control signal 52b is connected to one input of the gate 166. The output of the gate 166 is connected to the second input of the gate 168 and the output of the gate 168 is connected to the second input of the gate 166. The output of the gate 166 forms a forward directional mode latch signal 170 and the output of the gate 168 forms the reverse directional mode latch signal 172. The latch directional signals 170 and 172 are provided to the tray motor direction and mode control stage 118 in lieu of the respective control signals 52a, 52b of FIG. 2.

The tray motor direction and mode control stage 118 includes a first two input AND gate 174 having one input connected to the forward signal 170 and a second input connected to the tray drive enable signal 150 from the tray drive latch 120. A second two input AND gate 176 includes a first input connected to the reverse mode signal 172 and a second input connected to the tray drive enable signal 150. A servo mode disable transistor 178 includes a base lead connected through an input resistor to the tray drive enable signal 150. The collector of the transistor 178 is connected to provide an output 180 as a servo drive disable control signal to the tray motor drive 82. The emitter of the transistor 178 is connected to ground potential.

The forward and reverse control signals 52a and 52b are each connected to one input of a two-input OR gate 182 of the elevate/reset gating stage 110. The output of the OR gate 182 forms the forced mode sustaining signal 152. The output of the OR gate 182 is connected through a capacitor 184 to one input of a two-input OR gate 186. The output of the OR gate 186 forms the elevate latch enable signal 136 connected to the elevate drive latch 112. A resistor 188 is connected between ground potential and the junction between the capacitor 184 and the first input to the gate 186. A second input to the gate 186 is connected to ground potential through a resistor 190. The second input of the gate 186 is also connected through a capacitor 192 to the control output 98 of the tray drive motion sensing stage 96.

Another two-input OR gate 194 of the elevate/reset gating stage 110 includes a first input connected to the switch transition output 144 of the elevate switch debounce stage 116. The second input of the OR gate 194 is connected through the series combination of a resistor 196 and a capacitor 198 to a +12 V supply line 200. The second input of the gate 194 is also connected to ground potential through a resistor 202. The second input of the gate 194 is also connected through a diode arranged cathode to anode and a resistor 206 to the output 76 of the current limit sensing stage 74.

The elevate latch enable signal 136 is connected to a first input of a two-input NOR gate 208 of the elevate drive latch 112. The output of the NOR gate 208 is connected to one input of a two-input NOR gate 210. The second input of the NOR gate 210 is connected to the elevate latch reset signal 146. The output of the NOR gate 210 is connected to the second input of the NOR gate 208 to form a latch arrangement of the gates 208 and 210. The output of the NOR gate 210 is connected to provide the elevate enable signal 138 to the elevate tray interlock gate 114 as one input to the two-input AND gate 114. The second input to the AND gate 114 is the enable signal 84 from the tray drive latch stage 120.

The output of the elevate tray interlock gate 114 drives the elevate motor drive amplifier stage 60 by connection through a series resistor to an operational amplifier stage 216 at the noninverting input of the amplifier. The output of the amplifier 216 is coupled to a push-pull output stage including transistors 218 and 220. The common emitter connection of the transistors 218 and 220 provides the elevate drive signal output 62 to the elevate motor 64. The other end 221 of the motor 64 is connected to the noninverting input of an amplifier 222 of the current limit sensing stage 74 for the elevate motor. The output of the elevate motor drive amplifier 216 is connected to the inverting input of the amplifier 216 through a resistor 224. Connected across the resistor 224 is a series combination of two resistors 226 and 228. The junction of the resistors 226 and 228 is connected to ground potential through a braking control capacitor 230 whose function will be explained in more detail hereinafter.

The elevate switch debounce stage 116 includes a latch formed by two, two-input NAND gates 232 and 234. One input of the gate 232 is connected to the up-limit switch signal input 72a from the up-limit switch 140. One input of the gate 234 is connected to the down-limit switch input signal 72b from the down-limit switch 142. The switch actuator 236 for the switches 140 and 142 is operated by the slide elevate mechanism 68. The output of the gate 232 is connected to the second input of the gate 234 and the output of the gate 234 is connected to the second input of the gate 232. The output of the gate 232 is connected through a capacitor 238 to provide the up-switch transition control signal 148. The control signal 148 is connected to ground potential through a resistor 240. The up-switch transition signal output 148 is also connected to one input of an OR gate 242. The output of the gate 242 forms the switch transition control line 144. The output of the gate 234 is connected through a capacitor 244 to the second input of the gate 242. The second input of the gate 242 is also connected to ground potential through a resistor 246.

The tray reset gating stage 122 includes a two-input NOR gate 250 having one input connected to an initialize signal 197 from the elevate reset gating stage 110. The output of the gate 250 forms the slide count output signal 100. The output of the gate 250 is also connected to a first input of a two-input NOR gate 252. The second input of the NOR gate 252 is connected to the forced mode sustaining signal 152. The output of the gate 252 is connected through a series resistor to provide the signal 158. The second input of the gate 250 is connected through a capacitor 254 to the output of an operational amplifier 258. The second input of the gate 250 is also connected through a resistor 260 to ground potential.

The noninverting input of the amplifier 258 is connected to a reference voltage provided at the junction of two resistors 262 and 266. The resistor 266 is connected to the +12 V supply and the resistor 262 is connected to ground potential. The noninverting input of the amplifier 258 is also connected to the output 157 of the aperture center detector 123. Further, the noninverting input of the amplifier 258 is connected through the series combination of a diode 261 arranged cathode to anode and a capacitor 263 to the tray drive signal 150. A resistor 265 is connected between ground potential and the junction of the diode 261 and the capacitor 263. The inverting input to the amplifier 258 is connected to the +12 V supply through a resistor 264. The inverting input of the amplifier 258 is also connected to the photodetector current source signal line 156 and to the control output 155 of the tray current sensing stage 102.

The tray drive mode select latch stage 120 includes two, two-input NOR gates 268 and 270 interconnected in a latch arrangement. The latch gate 268 includes the two signals 104 and 158 at one input. The second input of the gate 268 is connected to the output of the gate 270. The output of the gate 268 is connected to one input of the gate 270. The second input of the gate 270 is connected to the up-switch transition signal output 148. The output of the gate 268 provides the tray drive control enable signal 150 to the tray motor direction and mode control stage 118. The output of the gate 270 is connected to provide the elevate control signal 84.

The tray motor drive stage 82 includes an amplifier 274 having a noninverting input connected through a series resistor 276 to the forward drive signal 80a and an inverting input connected through a series resistor 278 to the reverse drive signal 80b. The output of the amplifier 274 is connected to a push-pull output stage including transistors 282 and 284. The common emitter output of the transistors 282 and 284 is connected to the motor control signal 86 to the slide tray motor 88. The feedback resistor 286 is connected between the output of the amplifier 274 and the inverting input. Two resistors 288 and 290 are connected across the resistor 286. A capacitor 292 is connected between a junction of the resistors 288 and 290 and ground potential. The control output 95a of the forward photodetector 128 is connected through the series combination of two diodes 294 and 296 arranged anode to cathode to the noninverting input of the amplifier 274.

Similarly, the control output 95b of the reverse photodetector 126 is connected through the series combination of two diodes 298 and 300 arranged anode to cathode to the inverting input of the amplifier 274. The servo inhibit and disable signal 180 from the tray motor direction and mode control stage 118 is connected to the junction of the cathodes of the two diodes 302 and 304. The anode of the diode 302 is connected to the reverse servo control signal 95b and the anode of the diode 304 is connected to the forward servo control signal 95a. A resistor 306 is connected between ground potential and the second end 307 of the tray motor 88.

The motor circuit line 307 is also connected to the junction of two resistors 308 and 310. The other end of resistor 310 is connected through a resistor 312 to the −12 V supply line 314. The second end of the resistor 308 is connected through a resistor 316 to the +12 V supply. Resistors 308, 310, 312 and 316 are provided in the current sensing path of the tray motor current sensing stage 102. The junction of resistors 308 and 316 is connected through a diode 318 arranged anode to cathode to the noninverting input of an amplifier 320 of the tray motor current sensing stage 102. The junction of the resistors 310 and 312 is connected through a diode 322 arranged cathode to anode to the inverting input of the amplifier 320.

The output of the amplifier 320 is connected through a series resistor 323 to the emitter of an NPN transistor 324. The collector of the transistor 324 provides the control output 155 to the tray reset gating stage 122. The emitter of the transistor 324 is also connected to ground potential through a resistor. The base of the transistor 324 is connected to the junction of two resistors that are connected in series between the +12 V supply and ground potential. The output of the amplifier 320 is also connected to one end of a potentiometer 325. The other end of the potentiometer 325 is connected to ground potential. The wiper arm or tap of the potentiometer 325 is connected through two series resistors to a buffer gate 326. A capacitor is connected between the junction of the two series resistors and ground potential. The output of the buffer gate 326 is connected through a diode 327 arranged anode to cathode to provide the excessive current signal 104.

The tray drive motion sensing stage 96 includes a latch arrangement formed by two, two-input NAND gates 330 and 332. The output of gate 330 forms the elevate set input signal 98. The output of the gate 332 is connected to one input of the gate 330. The output of the gate 330 is also connected to one input of the gate 332. The second input of the gate 332 is connected to the elevate mode enable signal 84. The second input of the gate 330 is connected through a resistor 334 to the output of the amplifier 336. The second input of the gate 330 is also connected through a capacitor 338 to ground potential. The noninverting input of the amplifier 336 is connected through the series combination of a diode 340 arranged cathode to anode and a resistor 342 to the tray motor drive signal 86. Similarly, the inverting input of the amplifier 336 is connected through a diode 344 arranged anode to cathode to the junction of the resistor 342 and the diode 340.

The aperture center detector stage 123 includes an amplifier 331 having a noninverting input connected through a series resistor to the photodetector output 94b and an inverting input connected through a series resistor to the photodetector output 94a. The output of the amplifier 331 is connected through a series resistor 333 to the anode of a first diode 335 and to the cathode of a second diode 337. The cathode of the diode 335 is connected to the inverting input of an amplifier 339. The anode of the diode 337 is connected to the noninverting input of the amplifier 339. The output of the amplifier 339 is connected through the series combination of a capacitor 341 and a resistor 343 to the control output 157.

Considering now the operation of the control apparatus 10 of FIG. 4 and referring additionally to the timing waveform diagram of FIG. 10, operation proceeds with the initiation of the slide advance control signal; for example, a forward advance signal transition on the forward control line 26a from a high level to a low level. In response to the low level at line 26a, the transistor 162 is turned off and the signal at 52a is a high transition signal.

For a single slide advance the result at 52a is a short durational high transition signal. For the rapid search and random access modes to move the slide tray a number of slide tray positions, the signal at 52a is maintained at a high transition level for a period of time corresponding to a desired number of slide positions as determined by the slide count signal 100.

In response to the high transition at 52a, the latch formed by gates 166 and 168 in the forward/reverse logic stage 50 is latched in the forward mode with a high level at output 170. Further, the high transition signal at 52a is coupled through the gate 182 of the elevate set reset gating stage 110 and through the capacitor 184 with the gate 186 providing a high transition pulse to the gate 208 and the elevate drive latch 112. The result is the setting of the elevate drive latch 208 to the elevate latch condition with a high output at 138 of the gate 210 coupled to the gate 114 of the elevate tray interlock 114. This results in the elevate motor drive amplifier stage 60 being actuated to control operation of the slide elevate motor 64 to elevate the slide from the projection position to the upward slide tray position.

When the slide elevate mechanism 68 reaches the predetermined up-limit position, the up-limit switch 140 is actuated and a low going transition signal is supplied on line 72a to the gate 232 of the elevate switch debounce stage 116. The transition on line 72a latches the arrangement of gates 232 and 234 and a pulse signal is supplied at output 148 through the capacitor 238. A pulse signal is also transmitted through the OR gate 242 to the common switch transition output line 144. A pulse on the signal line 144 is coupled through the gate 194 to reset the elevate drive latch 208 and thus terminate operation of the slide elevate motor 64 through the elevate tray interlock gate 114 of the elevate motor drive amplifier 60.

The pulse on the signal line 148 is coupled to the gate 270 of the tray drive latch stage 120 whereupon the latch is set to the tray drive mode with a high output at the control signal output 150. With two high level inputs to the AND gate 174 of the tray motor direction mode control stage 118, the gate 174 is enabled to provide at 80a a forward tray drive control signal to the tray motor drive amplifier stage 82. Thus, operation of the slide tray motor 88 is accomplished to move the slide tray from one slide position toward the next slide position.

In the case of a single slide advance control signal being applied to the forward/reverse logic stage 50, the forced mode sustaining signal 152 is a low level at this time. Thus, as the photodetectors 126 and 128 begin to conduct as the aperture 132 nears alignment with the detecting station of the source 124 and the photodetectors 126, 128, the current sensed through the resistor 264 by the amplifier 258 results in a pulse signal through gate 250 as a negative going transition signal to the input of the gate 252. The output of the gate 252 provides a positive going pulse transition signal to the gate 268 of the tray drive latch thereby resetting the latch and terminating the force mode drive signal at 150. The time of transistion from the forced mode to the servo mode in terms of aperture alignment relative to the photodetector at the detecting station is varied by the control apparatus 10 as a function of frictional tray drive loading as will be explained in more detail hereinafter.

Thus, the forward drive signal 170 from the forward/reverse logic stage 50 is inhibited from passing through the gate 174 since the second input at 150 to the gate 174 is a low level.

Operation of the control apparatus 10 at this point terminates the forced mode of operation and enters the servo mode of operation under the control of the photodetectors 126 and 128. Thus, the tray motor drive amplifier 274 is controlled in accordance with the servo feedback signals 95a and 95b from the photodetectors 126 and 128. If the tray is being moved in the forward direction, the aperture 132 first approaches the forward photodetector 128 and thus conduction of the forward photodetector 128 initially occurs. Then as the aperture 132 moves through the center point of the detection station as measured by the line drawn between the center of the source 124 and the center of the photodetector 126 and 128, conduction of both photodetectors 126, 128 is approximately equal. Next, as the tray tends to overshoot past the center aligned position of the aperture at the detection station, the reverse photodetector 126 begins to conduct at a higher level than the forward photodetector 128 since the aperture is more nearly aligned with the reverse photodetector 126 and a greater amount of light from the source 124 impinges upon the reverse photodetector 126.

Thus, the differential outputs of the photodetectors 126 and 128 at 94b and 94a, respectively, control operation in a closed loop fashion to drive the amplifier 274 and operate the motor 88. With higher conduction in the reverse detector 126, by means of signal 94b, the polarity of output drive from the amplifier 274 at 86 reverses the motor direction. Thus, the tray is stopped with the aperture 132 aligned with the detection station and with the slide aligned with the slide elevate mechanism 68; the center of the aperture 132 being aligned with the line drawn between the midpoint of the photodetectors 126, 128 and the center of the source 124. Tray motion is sensed by the amplifier 336 of the tray drive motion sensing stage 96 in response to the voltages of the servo mode operation at the output 86 to the motor 88.

In response to the control pulses at the output of the amplifier 336, the integrator formed by resistor 334 and capacitor 338 integrates the output of the amplifier 336 to set the latch formed by gates 330 and 332 and provide a positive going transition at 98. The positive going transition at 98 is coupled through the capacitor 192 as a positive going pulse signal through the gate 186 to again set the elevate drive latch 112.

Thus, the elevate enable latch signal 138 along with the high level on the elevate enable line 84 provide a high output through the elevate/tray interlock gate 114 to provide operation of the slide elevate motor 64 whereupon the slide elevate mechanism 68 transfers the slide aligned at the slide change projection station from the tray position down to the projection position.

When the slide elevate mechanism 68 moves the slide to the projection position, the down-limit switch 142 is actuated to provide a low transition at signal line 72b to the gate 234. The gate 234 inverts the negative going transition to a positive going transition at its output. The positive going transition at the output of the gate 234 results in a pulse being generated to the input of the gate 242 by means of the capacitor 244. The positive going pulse at the output of the gate 242 at switch transition signal line 144 is coupled through the gate 194 of the elevate set reset gating stage 110 to the reset line 146 of the elevate drive latch 112 to reset the latch to the elevate disable mode.

Thus, operation of the slide elevate motor 64 is terminated with the slide in the downward projection position. The control apparatus 10 is then in a stable mode of operation in an idle state awaiting the next instruction for slide advance or reverse for a single slide or for instruction in either the rapid search mode or random access mode.

For the single slide advance situation, the signal at 52a is a short durational high transition signal. Correspondingly, the forced mode sustaining signal 152 is also a short durational signal. Thus, at the time of transition at the end of the elevate slide mode to return the slide from the projection position up to the slide tray position and before the initiation of the forced mode of tray movement, it is necessary to temporarily inhibit servo mode operation. Transition to servo mode operation at this point would maintain the tray in the present slide tray position.

For this purpose and at the transition from the slide elevate mode to the forced tray drive mode, the tray output drive signal 150 from the tray drive latch 120 through the capacitor 263 and the diode 261 provides a temporary servo inhibit control signal to the noninverting reference input of the amplifier 258. The temporary high level input to the noninverting input of the amplifier 258 ensures a steady state output of the amplifier 258. Thus, the amplifier 258 is temporarily inhibited from responding to any changes in signal level at the inverting input that might result from noise or changes in the photodetector current drain as the tray begins to move in the forced mode. After tray movement has begun and the previously aligned aperture moves away from the vicinity of the photodetectors, the temporary inhibit signal is no longer necessary and normal circuit operation resumes as described hereinbefore.

Consider now the situation where a continued high level signal at any of the inputs 14a, 14b, 26a or 26b is provided for either the rapid search or random access mode to move more than one slide position. The continued high signal at 52a or 52b through the gate 182 provides a continued forced mode sustaining signal at 152. With a high signal at 152 to the gate 252, the gate 252 will not respond to the pulse signal at the output of the gate 250 derived from the amplifier 258 in response to conduction of the photodetectors as the tray moves the apertures past the photodetectors from slide position to slide position. Thus, a negative going transition will not be passed through the gate 252 and the output at 158 will remain at a low level to the gate 268.

Thus, the tray drive mode select latch 120 will remain in the forced tray drive mode with the signal 150 being continually supplied as long as one of the drive signals 52a or 52b remains in the high state. The high tray drive signal 150 disables the servo mode signals from the photodetectors in the tray motor drive stage 82 through the transistor 178.

Thus, for random access or rapid search mode, after the elevate sequence is accomplished to elevate the slide from the projection position to the slide tray position, the slide tray is rotated to the desired slide position before the drive signal 52a or 52b is terminated and before servo mode operation begins to accurately stop the tray at the desired position.

Considering now the operation of the control apparatus to vary the point of transition from the forced mode to the servo mode as a function of frictional tray drive loading, the control output 155 of the tray motor drive current sensing stage 102 provides a varying reference signal at the inverting input of the amplifier 258 of the tray reset gating stage 122 as a function of the sensed current of tray drive motor 88.

As the current of the tray drive motor increases, the amplifier 320 and the transistor 324 are effective to vary the current through the resistor 264 to result in an increased voltage level at the inverting input of the amplifier 258. Thus, the higher the frictional loading on the tray drive motor 88, the higher the reference level at the inverting input of the amplifier 258.

The point of transition from the forced mode to the servo mode is defined by the voltage level at the inverting input of the amplifier 258 dropping below the fixed reference level at the noninverting input.

Figure 15:
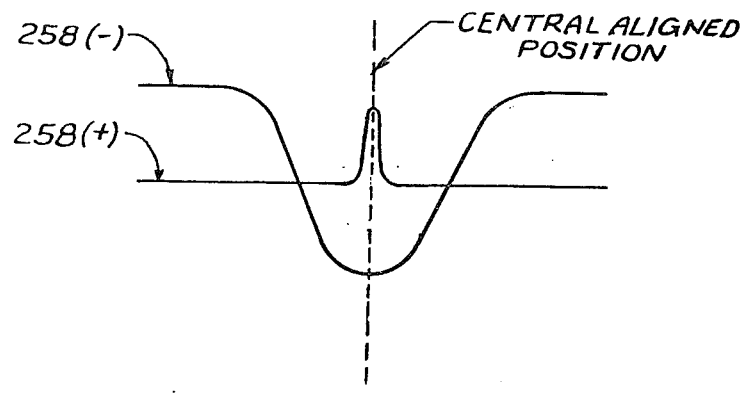
FIGS. 15 and 16 are graphic representations illustrating signal waveforms of the operation of the control apparatus for varying load conditions of the slide tray drive arrangement.

In the situation where light frictional loading is present, FIG. 15, the control signal at 155 is essentially inoperative and the point of transition to servo mode operation is governed predominantly by the current sourced through the resistor 264 to the photodetectors 126,128 through the line 156. Thus, as the aperture approaches the first photodetector and the photodetector begins to conduct, the transition from the forced mode to the servo mode occurs before the aperture reaches the aligned position centrally between the photodetectors 126, 128. This is desirable in light frictional loading situations, since the tray will tend to overshoot the center aligned position and the driving forces in the servo mode are sufficient to control movement of the slide tray past the transition position.

In the case of higher frictional loading, the point of transition from the forced to the servo mode should be nearer the center aligned aperture position between the photodetectors at the detection station since the inertia of the tray may not be great enough under high friction, slower drive conditions to allow the tray to move past the earlier transition position to the center position. Further, in some circumstances of extremely high frictional loading, the servo drive forces alone may not be adequate to move the tray to the center aligned position. This situation is encountered when the slide tray is deformed.

Thus, in high frictional loading situations, the control signal 155 raises the normal bias level at the inverting input of the amplifier 258 such that a larger conduction current is required by one photodetector to bring the inverting input below the noninverting input. This results in a transition from the forced mode to the servo mode corresponding to a slide tray position with the aperture being nearer the central aligned position at the detection station.

Figure 16:
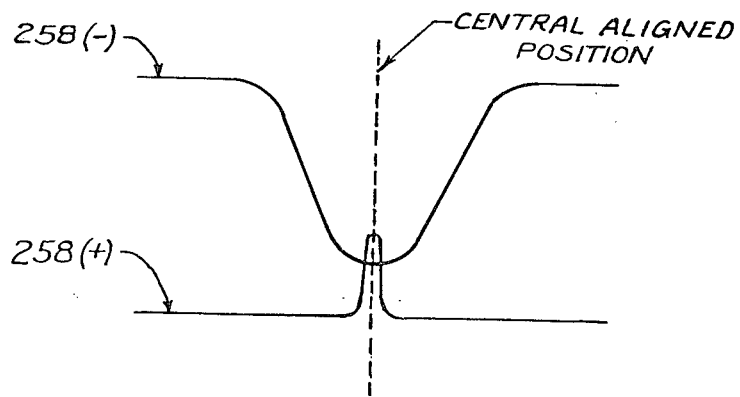

In order to ensure transition from the forced mode to the servo mode in situations of extremely high frictional loading on the tray drive motor 88, FIG. 16, the control output 157 of the aperture center detector 123 is active at the center aligned aperture position. The control output 157 at the center aligned aperture position provides an increased level at the noninverting input of the amplifier 258 at the time of center aperture alignment. Thus, for high frictional loading situations, this ensures that the level at the inverting input will be below the reference level at the noninverting input to provide the transition from the forced mode to the servo mode. Of course, the control output 157 would be necessary only in situations of extremely high frictional loading on the slide tray drive motor.

Considering operation of the tray motor drive 82 and specifically electronic braking action performed during the forced mode operation, as the amplifier 274 provides a drive signal to the push-pull transistors 282, 284 to provide the motor drive output at 86, the capacitor 292 in the feedback circuit of the amplifier 274 is appropriately charged. For example, if the control apparatus 10 conditions the tray motor drive stage 82 to the forced forward drive mode, the capacitor 292 will become positively charged to a level dependent upon the output drive control voltage of the amplifier 274.

As the forced mode of operation is terminated and the servo mode of operation begins, the forced forward mode drive signal 80a Iis removed and the servo feedback signals 95a, 95b control servo mode operation of the amplifier 274 to control operation of the motor 88. Upon the termination of the forced mode, the stored charge on the capacitor 292 provides a braking signal at the inverting input of the amplifier 274 to provide a control voltage at the output of the amplifier 274 to brake operation of the motor 88 by the provision of a brake voltage level opposite in sign to the control voltage during forced mode operation.

For example, after the forced forward mode has been terminated, a negative control voltage output of amplifier 274 is obtained and the push-pull transistors 282, 284 provide a braking signal at 86 to the motor 88.

In response to the dynamic operating characteristics of the motor 88 the braking action proportionally increases with the speed of the motor and proportionally decreases with the load on the motor. This is accomplished in response to the drive voltage level at 86 and the RC time constant provided by resistor 290 and capacitor 292. For example, if the motor is heavily loaded, the control voltage 86 tends to drop and then the charge on the capacitor 292 also drops. When the motor 88 is operating at high speeds in response to a control voltage at 86 for a relatively long time duration in the rapid search mode or random access mode, the capacitor 292 receives a higher charge and thus provides a higher degree of braking.

Further in the forced reverse mode of operation, the capacitor 292 also stores a negative voltage for application to the amplifer 274 to provide braking operation by applying a forward drive signal at the output of the amplifier 274. Similarly, the elevate motor drive stage 60 also provides electronic braking action of the elevate slide motor 64 through the provision of the capacitor 230.

Referring now to FIG. 3 and considering now a specific embodiment of the digital filter 36 of FIG. 1 utilized in the alternate embodiment without a CPU controller 24, the digital filter 36 responds to the 1 KHz signal sine wave and encoded tape advance signals at the audio input 38 to provide the advance control signal 12. In a specific arrangement compatible with recognized standards, the encoded advance bursts are recorded as 1000 Hz. signals of predetermined time duration on the program cassette tape 44 with a burst being recorded where slide advance is desired during the program tape.

The equalized preamp stage 350 amplifies the input signal from the tape head 40 and provides the output 352 to the digital filter as discussed hereinbefore.

The digital filter 36 includes a level comparator stage 354 having an input connected to the output 38 of the equalized preamp stage 350. The level comparator stage 354 provides an output at 356 when the signal at 38 exceeds a predetermined peak amplitude. The output 356 of the level comparator stage 354 is connected to a logic interface stage 358 that provides an output at 360 as a negative going logic level pulse in response to each positive going crossover of the signal at 356.

A charge pump stage 362 of the digital filter 36 includes a reset input 364 supplied from an output of the limit gating stage 366. The charge pump stage 362 also includes trigger inputs 368 and 370. The charge pump stage 362 includes an output 372 connected to drive an integrator/comparator stage 374. The output of the integrator/comparator stage 374 provides the advance control signal 12. The output 372 of the charge pump stage 362 is averaged by the integrator/comparator stage 374 with signal frequencies in the acceptance band of the digital filter 36 resulting in a high enough level to trigger the integrator/comparator stage 374. The output 12 is normally near the +12 V supply voltage and when the integrator/comparator stage 374 is triggered, the output 12 drops to a level near the −12 V supply. An inverter stage 376 provides the trigger signals 368, 370 in response to the trigger signal output 378 of the limit gating stage 366.

The limit gating stage 366 also includes a trigger output signal 380 that is active in response to negative going signal crossovers at the input 360 to the limit gating stage 366. The trigger signal 380 is connected as a trigger input to a delay monostable stage 382. When triggered, the delay monostable stage 382 generates an output at 384 having a period equal to the period of the upper frequency limit of the acceptance band of the encoded tone burst. The output 384 of the delay monostable stage 382 is connected as a trigger input to a window monostable stage 386. The window monostable stage 386 is triggered by the trailing edge of the output 384 of the delay monostable stage 382. The window monostable stage 386 includes time enabled control outputs 388, 390 connected to control the limit gating stage 366. The window monostable stage 386 also includes a reset input 392 connected to the trigger output 378 of the limit gating stage 366 through a capacitor 394.

In operation, during the enabled period of the window monostable stage 386, the limit gating stage 366 includes a two-input NOR gate 396 that is enabled by the control line 388. Thus, if the input at 360 is negative going during this enabled period, a pulse will be passed through gate 396 to the trigger input 368, 370 of the charge pump stage 362 through the inverter stage 376. Thus, the charge pump stage 362 is retriggered in this manner.

If the signal at 360 is of different frequency, the pulse generated during the negative going portion of the signal will be gated through a second gate 348 of the limit gating stage 366 and connected to the reset input 364 of the charge pump stage 362 and thus reset the charge pump.

The equalized preamp stage 350 includes a burst defeat switch arrangement 400. The burst defeat switch 400 in the position illustrated in FIG. 3 connects the amplified signal at 38 in the equalized preamp stage 350 to the output 38 for processing by the level comparator stage 354 of the digital filter 36. In a second operative position, the burst defeat switch arrangement 400 disconnects the signal 352 from the output 38 to disable operation of the digital filter 36. The burst defeat switch position is utilized in a situation where the projection apparatus is to be made nonresponsive to the burst encoded signals on the tape 44. Further, in projection apparatus utilizing a CPU controller 24, the burst defeat switch 400 in the second position disables the input 25a to the CPU controller 24 by disconnecting the signal 352 from the output 25a.

An additional signal input 402 is provided at the output 352 of the equalized preamp stage 350 for purposes of obtaining an advance signal 12 from the digital filter 36 for slide advance operation during generation of program advance signals when recording a program tape 44 in projection apparatus not utilizing a CPU controller 24. Thus, the circuitry of the projection apparatus for encoding burst signals (not shown) is utilized to produce input signals at 402 to provide the advance signal 12 by means of the digital filter 36 and to advance the slide tray through operation of the control apparatus 10 during recording of the program. A defeat signal 403 is connected to disable a FET gate 405 of the preamp stage 350 during the encoding of burst signals thereby disabling the output of the preamp stage 350 at 352.

Referring now to FIGS. 5, 6, 7 and 8, the slide tray drive and turntable arrangement 90 and the tray position sensing arrangement 92 are illustrated in operative relationship. The turntable 412 carries the circumferential coded aperture ring 130 shown in more detail in FIGS. 7 and 8. The slide tray position sensing arrangement 92 is slidably carried by the housing 414 of the projector apparatus. The turntable 412 is carried by the housing 414 for rotary movement relative thereto. A gear ring 416 is integrally provided on the turntable 412 for engagement by a drive gear (not shown) driven by the slide tray motor 88. A slide tray 410 positioned atop the projection apparatus includes a registration notch 417 (FIG. 6) formed in the outer lip portion 418. The registration notch 417 interfits with a cooperating nose portion 419 of the turntable 412 for driving of the slide tray 410 by the turntable 412 and to provide proper registration of slide tray position with the turntable. Since the turntable 412 and the tray position sensing arrangement 92 provide only incremental slide position information, a zero position registration switch (not shown) is provided adjacent an actuating portion of the turntable 412 to provide zero absolute starting position information to the control apparatus 10 and the CPU controller 24.

The turntable 412 with the attached aperture ring 130 provides a circumferential space or cavity 420 (FIG. 8). The position sensing arrangement 92 includes a light pipe 422 (FIGS. 5 and 6) that cooperates with the light source 124 and extends into the cavity 420 for directing light from the source 124 onto the aperture ring 130. The photodetectors 126, 128 are mounted in the position sensing arrangement 92 in a common detector module 424 immediately below the aperture ring 130.

Figure 9:
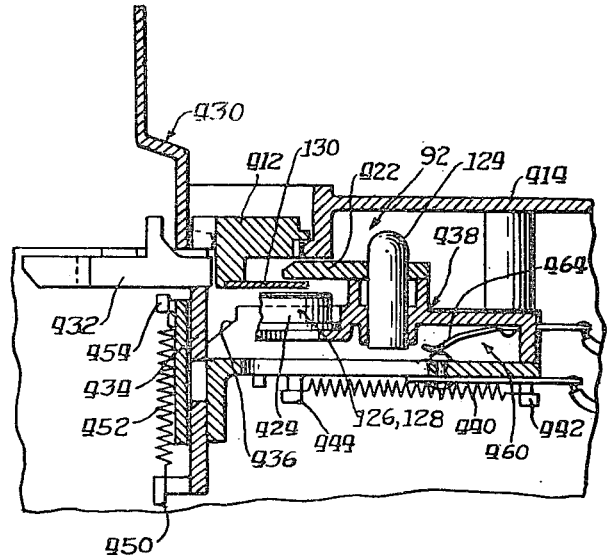
FIG. 9 is a sectional view similar to FIG. 6 and illustrating operation of the slide position sensing arrangement with a different slide tray.

The aperture ring 130 includes a first circumferential array 426 of apertures 132 including 81 apertures appropriately and equally spaced to correspond to the 81 positions of an 80 slide tray 410. The aperture ring also includes a second circumferential array 428 of apertures 132 including 141 apertures appropriately and equally spaced to correspond to the 141 positions of a 140 slide tray 430 (FIG. 9). With the 80 slide tray 410 in position as shown in FIGS. 5 and 6, the first array 426 of apertures 132 is directly aligned over the photodetectors 126, 128 as the slide tray 410 and the turntable 412 are rotated.

In a specific embodiment the photodetectors 126, 128 are implemented by chips that are each 0.050 by 0.165 inches arranged with the 0.165 dimensions along the circumferential path of travel of the aperture array 426. The detector module 424 provides a 0.020 inch space between the adjacent chips. Further, the apertures 132 are 0.070 by 0.070 inch formed in a stainless steel aperture ring 130.

Referring now to FIG. 9, a commercially available 140 slide tray 430 conventionally includes a downwardly extending portion 432 provided as a portion of a tray release mechanism. The movable sensing arrangement 92 includes a spring biased cam actuator 434 that is actuated by the extending portion 432. Upon downward movement of the cam actuator 434, the cam actuator operates a cam surface 436 of a spring biased platform 438 carrying the light source 124, the detector module 424 and the light pipe 422 of the position sensing arrangement 92. Thus, the movable platform 438 is positioned to the right in FIG. 9 into the 140 slide tray sensing position in response to the operation of the cam actuator 434 by the extending portion 432.

The position sensing arrangement 92 in the 140 slide tray sensing position of FIG. 9 accurately aligns the photodetectors 126, 128 with the path of travel of the aperture array 428. Thus, the photodetectors 126, 128 are appropriately positioned to cooperate with the apertures 132 of the 141 aperture array 428 to provide feedback signals to the control apparatus 10 for 140 slide tray position sensing and servo operation as discussed hereinbefore.

The movable platform 438 of the position sensing arrangement 92 is normally biased to the 80 slide tray sensing position by means of a spring 440 connected between an extending hook portion 442 of the platform 438 and an extending hook portion 444 of a U-shaped channel housing generally referred to at 446, 448 and mounted to the housing 414. The platform 438 is slidably mounted for movement within the U-shaped channel housing 446, 448. The cam actuator 434 is formed with an aperture to allow receiving of the cam surface 436 of the platform 438. The lower portion of the cam actuator 434 includes an extending hook portion 450. A spring 452 is connected between the hook portion 450 and an extending hook portion 454 of the U-shaped channel housing 446, 448 so as to bias the cam actuator 434 to the upward position. The cam actuator 434 is slidably mounted within the U-shaped channel housing 446, 448 between the respective upper and lower positions of FIGS. 6 and 9 within the channel formed by housing portions 456, 458.

A switch contact arrangement 460 provides a closed circuit to the control apparatus 10 when the slide tray position sensing arrangement is in the 140 slide tray position and an open circuit when the sensing arrangement is in the 80 slide tray position. The switch contact arrangement 460 includes a first fixed contact 462 carried by the lower housing portion 458. A movable spring contact arm 464 is carried by the movable platform 438. The spring contact arm 464 is arranged to contact the fixed contact 462 whenever the platform 438 is moved to the 140 slide tray position as shown in FIG. 9. The fixed contact 462 and the spring contact arm 464 are respectively connected to output signal connections 466, 468 for use by the CPU controller 24 at 558.

The slide tray position sensing arrangement 92 in another arrangement includes a single photodetector and two alternately energized light sources as disclosed in U.S. application Ser. No. 336,469 filed by R. Starai on Dec. 31, 1981, now U.S. Pat. No. 4,422,026, to which reference may be made for a more detailed discussion. Reference may also be made to U.S. application Ser. No. 336,523 filed by R. Parker et al. on Dec. 31, 1981, now U.S. Pat. No. 4,432,618, for a further discussion of alternate slide tray position sensing arrangements.

Considering now the details of the encoding and the decoding of the slide address signals by the CPU controller 24 and referring to FIG. 11, the encoded slide address signals are each in a burst format series of electronic pulses of predetermined periods and pulse widths in a predetermined coding format. The encoded slide address signals are provided as a data word in the burst format by pulse width modulation coding techniques. A typical encoded signal as depicted in FIG. 11 is defined by a burst format including in sequential order 180 clock pulses of one millisecond period referred to at 500, followed by two zero pulses referred to at 502, followed by eight data bits as a data word referred to at 504, followed by two zero pulses referred to at 506 followed by 255 clock pulses referred to at 508.

In a preferred embodiment, the entire period of one clock pulse is nominally 1,000 microseconds with a range of 900 to 1,100 microseconds. For a zero pulse, the period is nominally 1,500 microseconds with a range of 1,350 to 1,700 microseconds. The eight data bits in the data word portion 504 includes predetermined combinations of zero pulses and one pulses. For a one pulse, the period is nominally 750 microseconds with a range of 650 to 850 microseconds. The one or high level (approximately 5 volt) portion of each of the pulses in the burst format is always a nominal 500 microseconds.

The data word portion 504 of each burst format represents a digital slide address code of eight data bits in a binary coded format. Since 140 slide positions is the largest tray size conventionally provided for slide projectors, in the preferred embodiment binary numbers or data words corresponding to zero through 140 are encoded and decoded to represent the respective 140 slide positions. For example, the burst format portion 504 of FIG. 11 depicts the binary number or data word 01100111 corresponding to slide position 103. Since eight data bits are required to represent the 140 slide positions and an 8 bit binary number is capable of representing 256 different combinations, the data bits are also available to provide other control information such as mode and function control of the slide projector apparatus in addition to slide address identification.

To record a program cassette tape 44, the CPU controller 24 is effective to generate appropriate burst formats with corresponding slide address signals to the tape head 40 along with a bias oscillator signal to appropriately record desired burst formats on the tape 44 defining a program tape. In order to record the encoded slide address signals and the burst formats, the slide projector apparatus is conditioned to the record mode by inputting a proper record enable signal on the keyboard 28; for example, a code of 213 followed by actuation of the "EXECUTE" key.

The playback control of the cassette tape controls 42 is then actuated. At this point an operator may record appropriate burst formats by manipulation of the appropriate keys on the keyboard 28 defining valid slide position numbers. After each complete slide address has been entered including, for example, one to three digits, the operator actuates the "Record/Reverse" key. In this manner, the appropriate burst formats including respective data words corresponding to slide positions can be recorded on a random access program tape. A typical random access program, for example, might include slide position address numbers 1, 2, 10, 50, 75, 32 and 5 with each of the slide position addresses being encoded as a separate burst format on the program tape.

The CPU controller 24 also provides for decoding of a recorded program cassette tape 44 by decoding the burst format signals and the data words in the burst format portions 504 to appropriately control the apparatus 10 to move the slide tray turntable 90 to the appropriate slide positions in accordance with the synchronized narrative track of the tape program 44. It should be noted that the CPU controller 24 decodes recorded program tapes whether the program tape was recorded via the keyboard 28 of the slide projector apparatus or if the program tape was recorded by means of encoding circuitry separate from and independent of the slide projector to record the appropriate burst format signals with encoded slide address signals as exemplified by FIG. 11.

Turning now to a discussion of the detailed operation of the CPU controller 24 for encoding, recording and decoding burst format signals for the random access operation of the slide projection apparatus and referring now to FIGS. 12, 13 and 14, the encoding of the burst format signals will be explained in conjunction with the flow diagram of FIG. 12 and the decoding of the burst format signals will be discussed in connection with the flow diagram of FIG. 13. FIG. 14 illustrates a preferred embodiment of the CPU controller 24 and associated control circuitry as connected to the keyboard 28.

Referring now to FIG. 14 and considering the CPU controller 24, in a preferred embodiment the CPU controller 24 is implemented by a type 3870 microprocessor chip available for example from Mostek or Fairchild. The keyboard 28 is sensed for entry inputs in accordance with the monitoring input/output lines of the microprocessor 24 referred to generally at 512.

The data input 25a from the audio input 38 from the tape transducing head 40 is provided to the microprocessor at data-in input 514 through input circuitry 516. The input circuitry 516 provides a square wave input at 514 and 528 from the generally sine wave audio input at 25a from the tape head 40. The microprocessor 24 provides the data-out signal 25b for connection to the tape transducing head 40 via the conventional recording circuitry (not shown) of the cassette arrangement of FIG. 1. Suitable conventional playback and record audio amplifier circuitry is provided in the cassette tape arrangement between the tape head 40 and the data lines 25a, 25b.

The microprocessor 24 provides a forward/reverse signal at 518 and a GO signal at 519 that are connected through output control circuitry 520 to provide the forward logic output 14a and the reverse logic output 14b. The GO signal 519 is connected to a first input of each of two AND gates 521 and 523. The forward/reverse signal 518 is connected to the second input of gate 521 and through an inverter gate 525 to the second input of the gate 523.

The data-in input 514 is connected to one input of a two-input AND gate 522. The second input of the gate 522 is connected to a data-in inhibit line 524 from the microprocessor 24. The output of the gate 522 is connected to an external interrupt data input 528 of the microprocessor 24.

The projection apparatus of the present invention in the preferred embodiment includes a display referred to generally at 530. The display 530 includes three separate display digits representing hundreds, tens and units with each display digit being formed by a seven-segment array. The microprocessor 24 controls the display 530 to present slide address positions and other functional mode indications. For example, when slides are being selected by random access operation from the keyboard 28, the display 530 presents the slide presently being selected and projected. Further, during random access operation from a program tape 44, the number of the decoded slide is presented upon decoding. During the encoding of a program tape 44, the slide address numbers being encoded on the program tape and presented by the projection apparatus are also displayed.

The microprocessor 24 includes BCD display driver output signals 532, 534, 536 and 538 that are connected to a decoder driver stage 540. The decoder driver stage 540 provides segment drive output signals referred to generally at 542 including a segment driver output line to each of the seven segments of each display digit. The microprocessor 24 controls the three digits of the display in time-shared fashion. Each of the display segments also includes a decimal point display element utilized to provide indication of the pause mode operation of the tape player. The decimal points are controlled by an output line 544 connected to a transistor stage 546 driven from a pause output signal 548 of the microprocessor 24.

The pause output signal 548 is also connected through pause output control circuitry 550 to provide a pause output control line 552 connected to the cassette tape controls 42 for controlling the pause mode of the tape 44 in accordance with the timing signals from the microprocessor 24.

In order to sense the playback state of the cassette controller 42, the microprocessor 24 includes a playback input 556 provided at the output of a two-input NAND gate 555. A first input 554 of the NAND gate 555 is connected through a resistor network to a motor sense input 557. The motor sense input 557 is a high level signal when the cassette drive motor is operational. The second input 568 of the NAND gate 555 is connected to a mute input 570 through a transistor inverter gate 572. The mute input 570 is a low level signal when the cassette audio circuitry is operational and a high level when the audio is muted.

Thus, the playback input signal 556 is useful to indicate to the microprocessor 24 whether or not the cassette controls 42 and the cassette tape unit are in the playback mode. The microprocessor utilizes the playback input signal 556 to disable the keyboard 28 while the cassette program tape 44 is being played and also for determining that the cassette is operational before the recording of encoded burst format signals when recording a tape program.

An 80/140 switch input 558 is provided to the microprocessor 24 from the slide tray position switch 460 of the slide tray position sensing arrangement 92 to provide data to the microprocessor 24 indicating whether an 80 position slide tray or a 140 slide position tray is in position on the projection apparatus. A slide zero position switch input 560 is connected to the microprocessor 24 to provide an indication to the microprocessor 24 when the slide tray and turntable are in the zero or home position since no absolute position information is available from the tray position sensing arrangement 92. The slide count input 100 from the control apparatus 10 is connected through an inverter shaping gate to the microprocessor 24 at count input 562. A motion or traveling input 564 is connected through an inverter shaping gate to the traveling motion input 566 of the microprocessor 24. The traveling motion input 564 may be suitably provided from the control apparatus 10 at output 98 of the motion sensing stage 96.

The microprocessor 24 generates a high level signal at a record enable output 574 when the proper record mode entries have been made on the keyboard 28 (e.g. 213), the EXECUTE key has been actuated and the playback control of the cassette tape recorder has been actuated. If this sequence has not been achieved, the record enable output 574 will be a low level. The record enable output 574 is coupled through an inverter gate 575 and a transistor stage 576 to a record bias oscillator enable line 578 connected to the cassette tape unit to actuate the bias oscillator.

In operation, the microprocessor upon power initialization controls the slide tray turntable 90 to move the slide tray to the zero or home position before a random access program is either recorded or presented. The microprocessor 24 through the forward/reverse output 518 causes the slide tray to continue movement until the slide zero position switch input 560 indicates that the zero position has been reached.

Figure 12A:
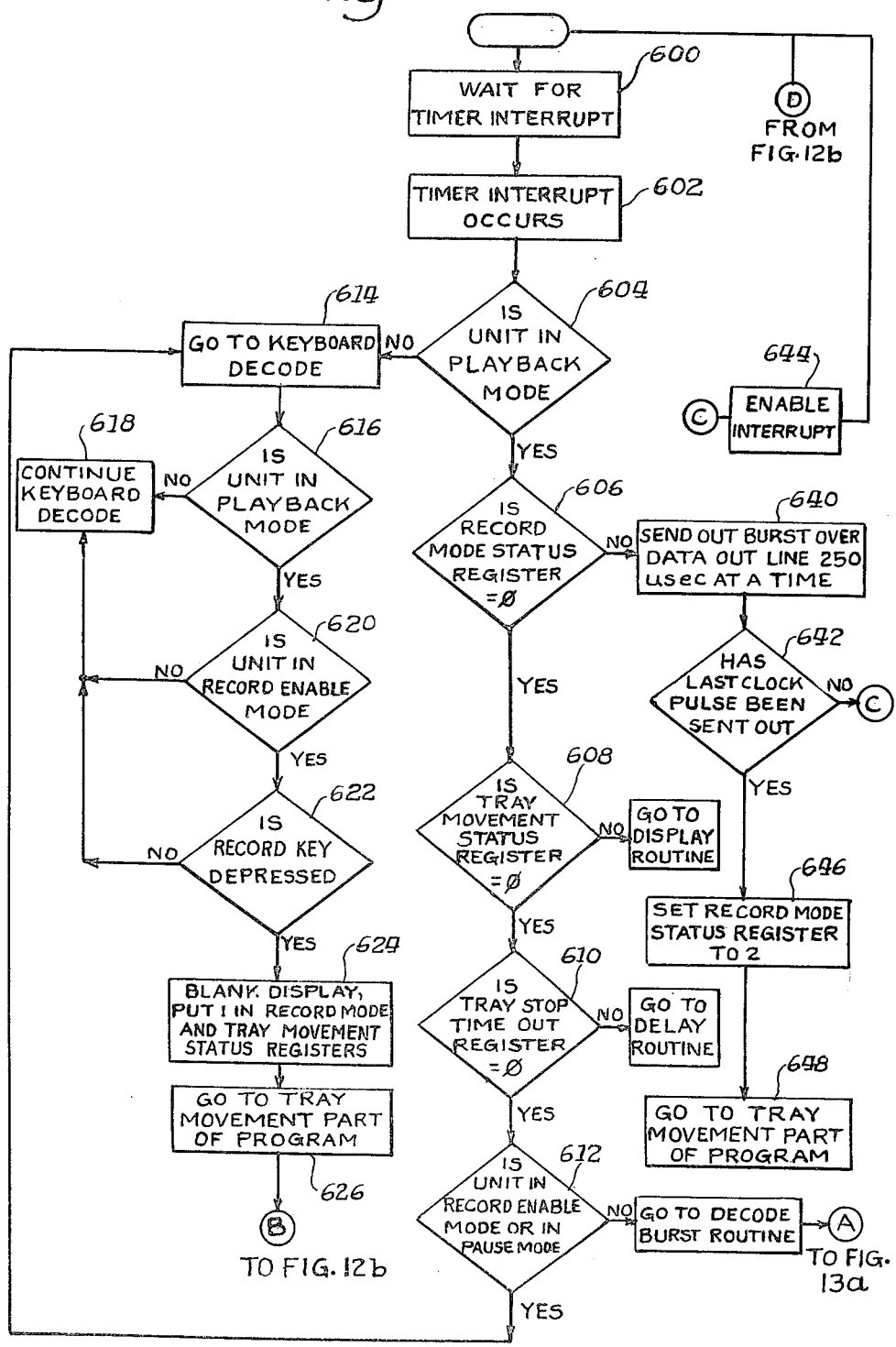

Turning now to a detailed discussion of the operation of the microprocessor 24 to encode and record tone burst formats for the recording of a random access program tape and referring now to FIG. 12, the program flow for encoding tone bursts is conveniently entered at function block 600 representing the program time where the program flow waits for a timer interrupt. A timer interrupt is an internally generated microprocessor signal that occurs after a predetermined amount of time that is selectable in accordance with the programming of the microprocessor. For example, at this stage of the program, timer interrupts are occurring every 6.9 milliseconds.

After a timer interrupt occurs represented by function block 602 in the program flow, the microprocessor checks if the cassette tape unit is in the playback mode as sensed from the playback input at 556. The determination is made in decision block 604. If the determination is YES, the program flow proceeds to a decision block 606 to determine the status of the record mode register. The record mode register is not zero if the record/reverse key has been depressed and a tone burst is in the process of being recorded.

If the status of the record mode register is zero, then the determination in decision block 606 is YES and the program flow proceeds to decision block 608 for the determination IS TRAY MOVEMENT STATUS REGISTER EQUAL TO ZERO? The status of the tray movement register is not zero if the tray is rotating as sensed at the tray movement input 566. If the tray is stopped the tray movement status register is zero and the determination in the decision block 608 is YES.

If the determination in decision block 608 is YES, the program flow proceeds to decision block 610 where the determination is made IS TRAY STOP TIME OUT REGISTER EQUAL TO ZERO? The tray stop time out register is set to a first value represented by "a" after the slide tray is conditioned to stop, to a value "b" after the tape cassette unit is conditioned to pause, or to a value "c" after the tape cassette recorder is told to unpause. The values a, b and c are representative of various predetermined numbers that are utilized as multipliers of the timer interrupt interval. For example when the register is set to the value represented by a, a programmed time is provided to allow for the slide elevate mechanism 68 to finish cycling. Correspondingly, when the register is set to the value b, the program time is provided to allow the cassette recorder time to stop for the pause mode. Further after an unpause indication, the value represented by c allows program time to allow the cassette recorder to start. The various time intervals a, b and c provide enough time for these functions to be accomplished before keyboard entries are recognized as valid.

If the tray stop time out register is zero, then the determination in decision block 610 is YES and the program flow proceeds to a decision block 612 where the determination is made IS UNIT IN RECORD ENABLE MODE OR IN PAUSE MODE? The term unit is used to represent the CPU controller 24 and the associated projection apparatus. The determination in the decision block 612 is YES if the record enable output signal 574 is at a high level corresponding to the proper sequence of entries on the keyboard and the cassette controls are in the playback mode or if the pause output is high.

With the determination being YES in the decision block 612, the program flow proceeds to a function block 614 representing the program flow GO TO KEYBOARD DECODE. The program flow as represented by the function block 614 then goes through the keyboard decode and display strobe program with the keyboard 28 being checked for key depressions and the appropriate corresponding control of the display 530. The keyboard decode program flow continues from function block 614 to a decision block 616 where the determination is made IS THE UNIT IN PLAYBACK MODE? If the unit is not in the playback mode, the determination is NO and the program flow proceeds to the function block CONTINUE KEYBOARD DECODE 618. If the determination in decision block 616 is YES, the program flow proceeds to determination block 620 where determination is made IS UNIT IN RECORD ENABLE MODE? If the determination is NO, the program flow proceeds to the continue keyboard decode program at 618. If the determination in block 620 is YES, the program flow proceeds to decision block 622 where the determination is made IS RECORD KEY DEPRESSED?

The playback mode and record enable modes are checked after a key is depressed because in the playback mode, only the pause key depression is allowed while in the record enable mode all keys except forward one and reverse are allowed as valid entries.

If the operator desires to record a slide address signal, he depresses the record/reverse key after having entered a digit or digits by the depression of appropriate keys in the keyboard 28. The program flow then proceeds into the record routine. This corresponds to a YES determination in the decision block 622 and the program flow proceeds to the function block 624 where the function is performed BLANK DISPLAY AND PUT "1" IN RECORD MODE AND TRAY MOVEMENT STATUS REGISTERS. The "1" put into the record mode status register functions as a flag to indicate that the record key has been depressed.

Next, the program flow proceeds from the function block 624 to the function block 626 GO TO TRAY MOVEMENT PART OF PROGRAM. The program flow proceeds in the tray movement program to a decision block 628 where a determination is made HAS A VALID NUMBER BEEN ENTERED FROM KEYBOARD OR DECODED FROM TAPE? For example, an error indication would result in decision block 628 if the digits for 81 were entered or decoded and the slide tray was an 80 position tray. Thus, if the determination in the decision block 628 is NO, the program flow would proceed to the function block 630 GO TO ERROR ROUTINE. If a valid number or digit has been entered on the keyboard or decoded from the tape, the determination in the decision block 628 is YES and the program flow proceeds to a decision block 632 where the determination is made IS RECORD MODE STATUS REGISTER EQUAL TO ONE? If the determination is NO, the program flow proceeds to the function block 634 representing the program flow to continue the tray movement portion of the program. If the determination in the decision block 632 is YES, the program flow proceeds to a function block 636 representing the loading of various registers with values necessary for the remainder of the record routine. The function block 638 also represents the setting up of the timer so that the interval between internal interrupts is now 250 microseconds.

The program flow proceeds from the function block 638 back to the function block 600 to wait for the next timer interrupt. After the next timer interrupt the program again checks for the unit being in the playback mode.

After the next timer interrupt occurs and proceeding now through the flow blocks 600, 602, 604 and 606, the determination in block 606 is now NO since the record mode status register has been loaded to a one state. The program flow now proceeds from function block 606 to the function block 640 representing the generation of and sending out of a burst tone format at the data output line 25b in 250 microsecond portions. The data word that is sent out in the burst represented by the function block 640 corresponds to the slide address number entered via the keyboard during the record function.

After the burst format as in FIG. 11 has been sent out to be recorded onto the cassette tape 44, the program flow proceeds to a decision block 642 where the determination is made HAS LAST CLOCK PULSE BEEN SENT OUT? If the determination is NO, the program flow proceeds through the enable interrupt function block and back through the program flow at function block 600 and repetitively through function block 640 until the entire burst tone format has been output. If the determination in decision block 642 is YES, the program flow proceeds to a function block 646 to set the record mode status register to a two state to represent that the recording is complete. The timer interrupt interval is then set back to 6.9 milliseconds and the program flow proceeds to a function block 648 representing the tray movement portion of the program.

During the tray movement program proceeding from function block 648, the tray movement status register is set back to zero so that the microprocessor will be ready for further recording of additional slide address signals as burst formats. The function block 640 represents the various program functions required for the sending out of the burst format including the format portions 500, 502, 504, 506 and 508. In one embodiment, the various registers loaded for the record function in function block 636 are utilized with appropriate incrementing and decrementing from their loaded positions to output the 180 clock pulses for the burst format portion 500, the two zero pulses in the burst format portion 502, the eight bit data word of burst format portion 504, the two zero pulses of burst format portion 506 and the 255 clock pulses of burst format portion 508. The eight bit data word representing format portion 504 is loaded into an appropriate register from the entries on the keyboard during the record function.

Figure 13B:
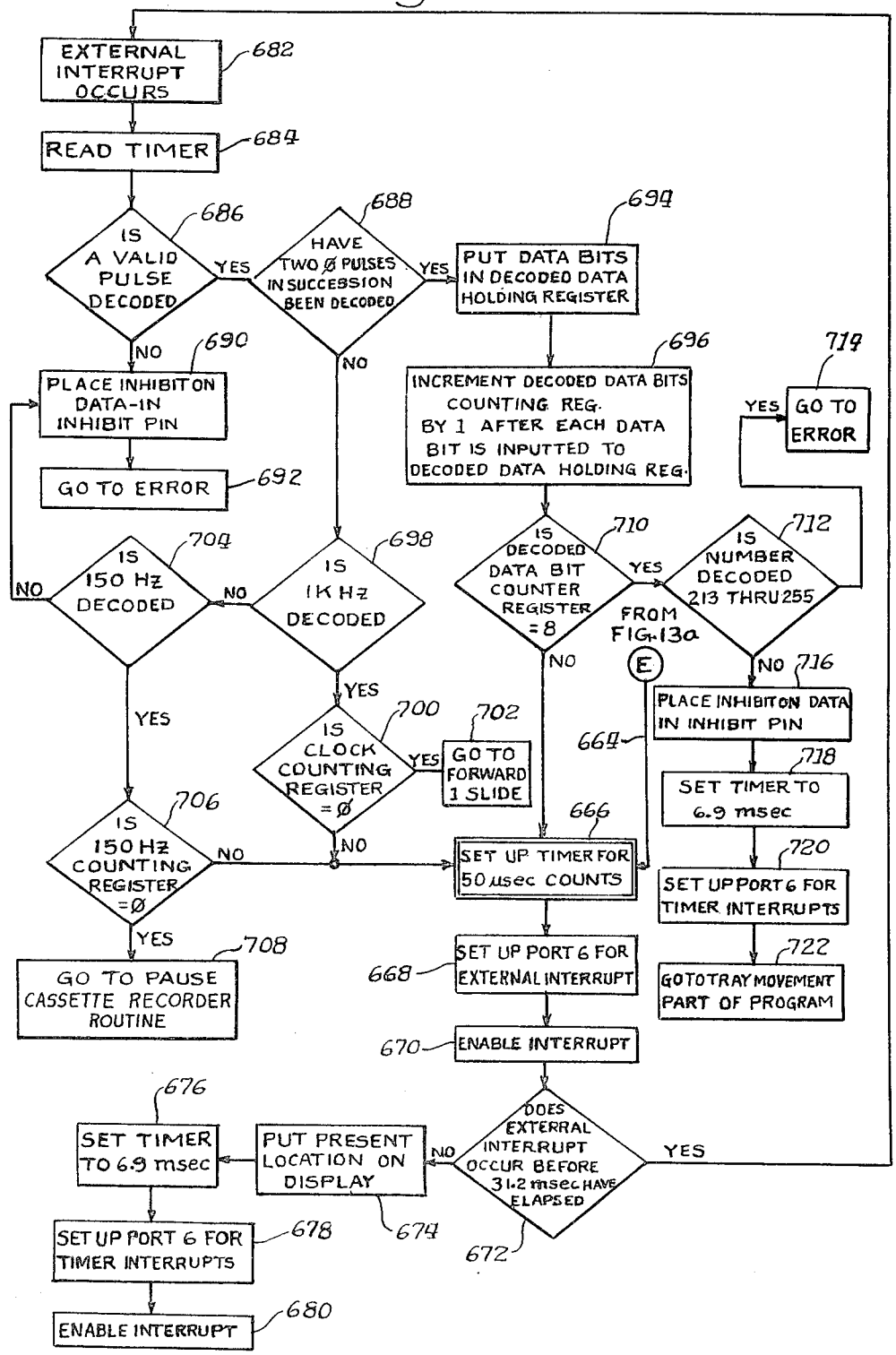

Proceeding now in the program flow through the determination block 612, if the determination is NO, the program flow proceeds to the burst decoding program routine of FIG. 13 as represented by the program flow marker GO TO DECODE BURST ROUTINE, at reference A.

Referring now to FIG. 13 and considering a detailed discussion of the operation of the microprocessor 24 for the decoding of tone format bursts from the cassette tape 44, tone bursts may be decoded from the cassette tape 44 with the microprocessor 24 in the playback mode. Specifically, the tone burst signals transcribed from the cassette tape by means of the transducing head 40 at 38 are coupled to the data input 25a. The generally sine wave input at 25a is processed through the input circuit 516 to provide a square wave input at data-in input 514. Further, the data input at 514 when not inhibited by gate 522 is coupled to the external interrupt data input 528.

The program flow FIG. 13 proceeds from the reference marker A of the decode routine to a decision block 652 where the determination is made IS THE UNIT IN AUTO ADVANCE OR AUTO PAUSE MODE? If the determination is YES, the program flow proceeds to the GO TO KEYBOARD DECODE function represented by the function block 654. If the determination in the block 652 is NO indicating that the unit is in the playback mode, the program flow proceeds to a decision 656 where the data input 514 is sensed for the presence of a "1" or high level (5 volt) input. This determination is made after the occurrence of every timer interrupt. When the data input line 514 is at a high or 5 volt level, the determination is YES and the program flow proceeds to function block 658 to increment the valid pulse counter register by one.

The program flow then proceeds to a decision block 660 where the determination is made IS COUNTER REGISTER EQUAL TO FIVE? If the determination is NO and the counter register has not yet been incremented to five, the program flow proceeds to the GO TO KEYBOARD DECODE function 654 until five pulses have been detected corresponding to the detection of a high level after five corresponding timer interrupts. After a high level is detected with the pulse counter register incremented to 5, the determination in block 660 is YES and the program flow proceeds to a function block 662 which represents the removal of an inhibit at data inhibit output 524 and the setting of the counter register back to zero. Further, various registers are also set up or loaded for the burst decode sequence. The burst input signal at 514 is then routed to the external interrupt data input 528 for decoding.

If the determination in decision block 656 is NO such that the voltage at the data input is a low, zero level, the program flow proceeds to a function block 657 to set a 310 microsecond delay. After the 310 microsecond delay the program flow proceeds through a decision block 659 to see if the delay function has been performed 15 times. If the delay has been performed 15 times, the program flow from the function block 659 proceeds to the function block 654, GO TO KEYBOARD DECODE. If the determination in the decision block 659 is NO and the delay has been performed less than 15 times, the program flow proceeds from the decision block 659 back to the decision block 656 to again interrogate the data input voltage. This is done to insure that a 5 volt signal at the data input will not be missed. This is especially important when decoding 150 Hz. tones since these signals correspond to 6.667 millisecond pulses which are very close to the timer interrupt interval of 6.9 milliseconds. If only one check of the data-in input after each timer interrupt were relied upon, the 150 Hz. tone at 5 volt level might never be detected and thus the tone would not be decoded.

An external interrupt occurs upon every positive going burst transition which results in the program entering the external interrupt service routine. This routine measures the width of each pulse and decides whether the pulse was a zero, a one, a clock pulse or a 150 Hz. pulse. The 150 Hz. pulse is utilized to denote a cue stop pulse from various program tapes having different encoding formats which utilize a 1,000 Hz. burst of predetermined duration for a one slide forward command and a 150 Hz. burst of predetermined time duration for a cue stop burst command.

In any case, when two zero pulses in succession are detected, the microprocessor program flow determines that the next eight pulses represent the data bits for decoding that represent a slide address signal. These eight decoded pulses or eight bits of information are put into a data register and decoded with the program then performing the function specified that corresponds to the eight bits of decoded information.

If 192 clock pulses are detected before two zero pulses in succession, the microprocessor 24 determines that a one slide advance signal is being decoded from a program tape corresponding to a 1,000 Hz. tone burst of predetermined time duration instead of an encoded slide address signal. Correspondingly, if ten 150 Hz. pulses are detected before two zero pulses in succession, the microprocessor 24 directs the pause mode (cue stop) condition of the cassette recorder. If during the course of a tone burst decode, an external interrupt does not occur within 31.2 milliseconds of the previous external interrupt, the burst decode program flow routine is aborted and the timer interrupts are reinitiated. This is done to prevent noise from causing the burst routine to become hung-up.

Proceeding now with the discussion of the detailed program flow of FIG. 13, the program flow from the function block 662 proceeds over the flow line 664 to a function block 666. At function block 666, after the timer is set up for 50 microsecond counts, the program flow proceeds to a function block 668 to set up the internal microprocessor port 6 for external interrupts; (where port 6 corresponds to the internal port for timer and interrupt control). This cancels the timer interrupt mode and enables the external interrupt mode as the program flow proceeds through a function block 670. Thus the internally generated microprocessor signal will no longer reset the program counter to the timer interrupt phase as in FIG. 12, program flow block 602. Instead, whenever an external interrupt occurs, the program counter of the microprocessor is set to a new location and sets up a 31.2 milliseoond time-out after the external interrupt is enabled.

The program flow proceeds from the function block 670 to a decision block 672 wherein the determination is made DOES THE EXTERNAL INTERRUPT OCCUR BEFORE 31.2 MILLISECONDS HAVE ELAPSED? If an external interrupt does not occur within the 31.2 millisecond time-out, the determination in decision block 672 is NO and the program flow proceeds to jump-out of the pre-burst decode routine to reenable the interrupt timer for 6.9 millisecond intervals and proceeds back to the keyboard decode and display routine as represented by the function blocks 674, 676, 678 and 680. These functions are accomplished to account for the case where noise may have placed the microprocessor program into a pre-burst decode routine. Further, the time-out is chosen sufficiently long so that some pulses can be missed and not cause the program to jump to other program flow routine portions such as due to a poor recording or such.

If the determination in the decision block 672 is YES, with an external interrupt occurring before the time-out of 31.2 milliseconds, the program flow proceeds through a function block 682 representing the occurrence of an external interrupt. The program then enters the burst decode routine. At the program point of function block 682, several other functions are also performed in accordance with a specific embodiment of the present invention. Specifically, the first external interrupt that occurs is ignored. This is done because by the time all the pre-burst routine instructions have been executed the first pulse may not be measured correctly. This is accomplished by setting a register to zero with the occurrence of the first external interrupt and interrogating the register to proceed in the program flow for the burst decode routine only when the contents of the register is zero corresponding to the second external interrupt.

The program flow upon the occurrence of the second interrupt proceeds to a function block 684 to read a timer that is set to, for example, 254 units upon the occurrence of an external interrupt. The value of the timer is read upon the occurrence of the next external interrupt with the timer value being decremented by one count every 50 microseconds. Thus, the resultant value read in the timer in the function block 684 is an indication of the length of the pulse present at the external interrupt input 528. The decode program then proceeds to determine whether the pulse was a clock pulse, a zero pulse, a one pulse, a 150 Hz. pulse or none of these particular pulses, resulting in an error pulse. The program flow proceeds to a decision block 686 to make the determination IS A VALID PULSE DECODED? If the pulse decoded is valid, the program flow proceeds to a decision block 688 to make the determination HAVE TWO ZERO PULSES IN SUCCESSION BEEN DECODED? If the determination in decision block 686 is NO, corresponding to an invalid pulse being detected, the program flow would proceed to a function block 690 to place an inhibit on the data-in inhibit 524. After the function block 690, the program would proceed to a function block 692 to enter an error program represented by the function GO TO ERROR.

Assuming that two zero pulses in succession have been decoded, the determination in the decision block 688 is YES and the program flow proceeds to a function block 694 representing the program flow to put the decoded data bits occurring after the two zeros into the decoded data holding register. The program flow proceeds from the function block 694 to a function block 696 to increment the decoded data bit counting register by one after each data bit is inputted to the decoded data holding register to thus assemble the decoded data bits as an eight bit word.

If the determination in the decision block 688 is NO (i.e., two zero pulses in succession have not been decoded) the program flow proceeds to a decision block 698 to determine if a one KHz pulse had been decoded. If the determination is YES in block 698, the program flow proceeds to a decision block 700 where the determination is made IS THE CLOCK COUNTING REGISTER EQUAL TO ZERO? A YES determination results in block 700 if a clock occurs before the two zero pulses in succession have been decoded. With this condition occurring and the clock counter register equal to zero, the program has effectively detected a 1,000 Hz. tone and the program proceeds from the YES decision path of the block 700 to a function block 702 to the GO TO FORWARD ONE SLIDE routine in response to a decoded 1,000 Hz. tone. If 1 KHz. has been decoded but the clock counting register has not been set to zero, then the NO decision flow path from the block 700 proceeds to the function block 666 to set up the timer for 50 microsecond counts.

If the program flow proceeds through decision block 698 and a 1 KHz. tone has not been decoded, the program flow proceeds to a decision block 704 where a determination is made IS 150 Hz. DECODED? If a 150 Hz. tone has not been decoded, the program flow proceeds to the function block 690 to place an inhibit on the data inhibit at 524. This is followed by a jump to the error routine. If a 150 Hz. tone has been decoded, then the program flow proceeds from the decision block 704 to a decision block 706 where the 150 Hz. counting register is checked for a zero or non-zero reading.

The 150 Hz. counting register which was set to a predetermined value at the beginning of the decode routine is decremented by a one count upon each occurrence of a 150 Hz. tone pulse. Thus, when the counting register is decremented down to zero, a pause function has been decoded and the program flow proceeds to the GO TO PAUSE CASSETTE RECORDER ROUTINE at function block 708.

If a 150 Hz. tone has been decoded but the counting register has not been decremented to zero, the program flow proceeds from the decision block 706 back to the function block 666 to set up the timer for 50 microsecond counts and the external interrupt decoding routine follows.

Considering the program flow through the decision block 700, the clock counting register for 1,000 Hz. tone pulses is set to a predetermined value at the beginning of the decode routine and decremented upon each occurrence of a decoded 1 KHz. tone. Thus, when the clock counting register equals zero, a move forward one slide function has been properly decoded and is implemented at 702. If a one or zero pulse as defined in connection with FIG. 11 is decoded before the two zero pulses in succession have been decoded, the occurrence of a one or zero pulse is ignored and the program stays in a burst decode routine. If a one or zero pulse is decoded after the two zero pulses in succession have been decoded, then the corresponding one or zero pulse is respectively decoded as a one or zero data bit in the data word portion 504 of the burst format representing a slide address signal or a mode control command.

Thus, after two zero pulses in succession have been decoded as determined by the decision block 688, the next eight pulses will be data bits and each time a one or zero is decoded it is placed in the least significant bit of the decoded data holding register and shifted left by one bit. At the same time, the decoded data bit counting register is incremented by one. When the decoded data bit counting register has been incremented to eight, the first pulse decoded is the most singificant bit in the decoded data holding register while the last pulse decoded is in the least significant bit of the decoded data holding register. This is represented in the program flow by the function blocks 694 and 696 with the program flow proceeding to decision block 710 where the determination is made IS DECODED DATA BIT COUNTER REGISTER EQUAL TO EIGHT?

If the determination is YES, and the decoded data bit counting register has been incremented to eight, the decoding of the data word is complete and the program flow proceeds to a decision block 712 where the determination is made IS THE NUMBER DECODED 213 THROUGH 255? In a specific embodiment, the decoded data word or number being equal to a number in the range 213 through 255 corresponds to a predetermined range of data words that are not assigned as either slide address signals or decodable mode command representations and thus are invalid data words.

Thus, if the determination in block 712 is YES, the program flow proceeds to a GO TO ERROR function block 714. If the number decoded in the decode routine is determined to be a valid number, i.e., either a slide address signal or proper mode control number, the decision in block 712 is NO and the program flow proceeds through the function blocks 716, 718, 720 and 722.

In the first function block 716, the inhibit on the data-in inhibit input is reestablished. In the function block 718, the timer is set to 6.9 milliseconds for the timer interrupt mode. The function block 716 represents the establishing of a zero volt low level on the data inhibit 524. The function block 720 sets up the internal port 6 for timer interrupts. The function block 722 proceeds to a tray movement program portion to implement the appropriate tray movement in accordance with the decoded data word. In addition, the program places a predetermined number in the tray stop time-out register such that clocks after the data word has been decoded will be ignored and the program will not proceed to the decode routine. After the function specified by the decoded data word is performed, the program is again ready to decode more bursts if the unit is still in the proper decode mode.

As discussed hereinbefore, if the decoded data word is a valid slide address signal such as in the range of one to 140 (with a 140 position tray), the tray is moved to the appropriate position in accordance with the microprocessor program. The program determines the appropriate direction of travel to move to the desired decoded position relative to the present position of the tray before the data word is decoded. The microprocessor program stores the address of the current position in a counter and receives slide count data at input 100 to maintain a present position count for the program to determine when tray movement is to be terminated to arrive at the correct determination.

While there has been illustrated and described several embodiments of the present invention, it will be apparent that various changes and modifications thereof will occur to those skilled in the art. It is intended in the appended claims to cover all such changes and modifications as fall within the true spirit and scope of the present invention.

What is claimed as new and desired to be secured by Letters Patent of the U.S. is:

1. Random access control apparatus for a slide projector that carries a slide tray and is responsive to predetermined encoded slide address signals in a first predetermined format comprising:

manually operable means for entering slide address codes in a second predetermined format, said manually operable means including a plurality of entry devices, each of said plurality of entry devices representing a respective one of the numerals 0 through 9, each of said slide address codes being entered on said plurality of entry devices as numerical codes representing a predetermined number of slide positions in the range of 1 to n where n is greater than 10;

a data transducing input;

control means responsive to predetermined encoded slide address signals in said first predetermined format at said data transducing input for decoding said predetermined encoded slide address signals and for generating slide tray movement control signals, said control means comprising manual random access means directly responsive to actuation of said entry devices to enter said slide address codes in said second predetermined format on said manually operable means for generating said slide tray movement control signals, said manual random access means comprising means for sensing actuation of said entry devices;

a data transducing output; and transport means responsive to said slide tray movement control signals for controlling the position of a slide tray, said control means further comprising encoding means operative in a program recording mode and responsive to said slide address codes entered on said manually operable means for generating encoded slide address signals at said data transducing output, each of said encoded slide address signals corresponding to a respective slide position of a slide tray and being encoded as a predetermined combination of audio tone bursts defining said first predetermined format.

2. The random access control apparatus of claim 1 wherein each of said predetermined encoded slide address signals represents a data word defined by a predetermined number of data bits.

3. The random access control apparatus of claim 2 wherein said data bits are encoded by pulse width modulation techniques.

4. The random access control apparatus of claim 1 further comprising tape transport and transducing means responsive to a recorded random access program tape for transducing from said recorded random access program tape said encoded slide address signals, said tape transport and transducing means providing said encoded slide address signals at said data transducing input.

5. The random access control apparatus of claim 4 wherein said random access program tape comprises at least two tracks and includes a plurality of said encoded slide address signals on a first of said tracks and narrative information on a second of said tracks synchronized with said encoded slide address signals.

6. The random access control apparatus of claim 4 further comprising means responsive to said encoding means for recording said encoded slide address signals onto said random access program tape.

7. The random access control apparatus of claim 4 wherein each of said slide address signals is encoded by said endoding means as a portion of a predetermined burst format, said predetermined burst format including in sequential order a predetermined plurality of pulses of a first distinctive type, at least two pulses of a second distinctive type, and said slide address signal.

8. The random access control apparatus of claim 4 wherein said control means further comprises means responsive to said encoding means for generating said slide tray movement control signal required to cause said transport means to move said slide tray to the position represented by said encoded slide address signals as each of said slide address signals is encoded.

9. The random access control apparatus of claim 6 wherein said slide address signal is encoded by a predetermined number of pulses representing a binary number, said pulses being of two different types corresponding to a one or a zero respectively.

10. The random access control apparatus of claim 1 wherein said control means further comprises means for determining the current slide position of said slide tray and means responsive to said current slide position determining means and said encoded slide address signals for determining the direction of minimum slide tray movement to arrive at the position corresponding to an encoded slide address signal.

11. The random access control apparatus of claim 10 wherein said current position determining means further comprises means responsive to movement of said slide tray for generating an incremental position signal representing a movement of said slide tray between each of said predetermined slide positions.

12. The random access control apparatus of claim 1 or 4 further comprising means responsive to said control means for displaying the slide at the slide position to which said transport means is controlled.

13. The random access control apparatus of claim 1 or 4 wherein said control means further comprises means responsive to standard slide advance signals at said data transducing input for generating a single slide advance control signal, said standard slide advance signal including a predetermined number of pulses of 1 millisecond period.

14. The random access control apparatus of claim 13 wherein said encoded slide address signals are encoded by pulse width modulation techniques, each of said encoded slide address signals representing a binary data word defined by a predetermrned number of binary data bits, each of said data bits being a one or a zero, said data word capable of defining $2^N$ slide addresses, where N is equal to the number of data bits in said binary data word, each data bit being represented in said encoded slide address signal as a one or a zero pulse.

15. The random access control apparatus of claim 14 wherein said one and zero pulses include respective different predetermined periods with respect to a nominal period of a predetermined time duration.

16. The random access control apparatus of claim 15 wherein said nominal period is 1 millisecond, a first of said one pulse or said zero pulse being greater than said reference period and said other of said one pulse or said zero pulse being less than said reference period in accordance with a predetermined one and zero coding format.

17. The random access control apparatus of claim 16 wherein each of said one and zero pulses includes a first predetermined polarity portion having a duration equal to a predetermined portion of said nominal period and a second predetermined polarity portion that is determined by said respective different periods of said one pulse and said zero pulse.

18. The random access control apparatus of claim 16 wherein said control means further comprises means responsive to a standard encoded cue stop signal for generating a cue stop control signal, said standard encoded cue stop signal including a predetermined number of pulses of approximately 6.67 milliseconds.

* * * * *